United States Patent [19]
Akasaka et al.

[11] Patent Number: 5,344,070
[45] Date of Patent: Sep. 6, 1994

[54] COMPUTER-CONTROLLED AUTOMOTIVE AIR CONDITIONING SYSTEM WITH FUZZY INFERENCE

[75] Inventors: Hitoshi Akasaka; Tomoko Kojima; Yuji Daimon; Hiroaki Saito, all of Tokyo, Japan

[73] Assignee: Calsonic Corporation, Tokyo, Japan

[21] Appl. No.: 177,607

[22] Filed: Jan. 4, 1994

[30] Foreign Application Priority Data

| Jan. 7, 1993 | [JP] | Japan | 5-001194 |
| Jan. 13, 1993 | [JP] | Japan | 5-004373 |
| Jan. 13, 1993 | [JP] | Japan | 5-004374 |
| Jan. 13, 1993 | [JP] | Japan | 5-004375 |
| Jan. 13, 1993 | [JP] | Japan | 5-004376 |
| Jan. 13, 1993 | [JP] | Japan | 5-004377 |
| Feb. 24, 1993 | [JP] | Japan | 5-035818 |

[51] Int. Cl.$^5$ .............................................. F24F 7/00
[52] U.S. Cl. ................... 236/49.3; 236/78 D; 395/61
[58] Field of Search ............. 236/49.3, 91 C, 78 D; 395/61, 900

[56] References Cited

U.S. PATENT DOCUMENTS

| 5,145,112 | 9/1992 | Ueda | 236/49.3 |
| 5,148,977 | 9/1992 | Hibino et al. | 236/78 D X |
| 5,167,365 | 12/1992 | Mitoshi et al. | 395/61 X |
| 5,259,814 | 11/1993 | Weissbrich et al. | 236/49.5 X |

*Primary Examiner*—William E. Wayner
*Attorney, Agent, or Firm*—Foley & Lardner

[57] ABSTRACT

A computer-controlled automotive air conditioning system comprises an air conditioning unit which, when operated, produces a conditioned air fed to a passenger room of the vehicle. An outside temperature sensor, an inside temperature sensor, a temperature setter switch, a solar radiation sensor and an intake air temperature sensor are arranged for issuing first, second, third, fourth and fifth information signals. A computer-installed control unit is employed for controlling operation of the air conditioning unit in accordance with the first, second, third, fourth and fifth information signals. The computer is operated under a fuzzy system theory so that the magnitude of at least one of the first, second, third, fourth and fifth information signals is divided into a predetermined number of fuzzy labels of membership function to derive a parameter for operation of the air conditioning unit.

18 Claims, 41 Drawing Sheets

TINC − TPTC

|      |     | C   | NT  | H   |   |   |   |   |
|------|-----|-----|-----|-----|---|---|---|---|
|      | VC  | Hi  | Lo  | Lo  |   |   |   |   |
|      | C   | MH  | Lo  | Lo  |   |   |   |   |
| TAMB | NT  | Lo  | Lo  | ML  |   |   |   |   |
|      | H   | Lo  | Lo  | Hi  |   |   |   |   |
|      |     |     |     |     |   |   |   |   |
|      |     |     |     |     |   |   |   |   |

|  | OP | C | NT | H |
|---|---|---|---|---|
| S | VF | F | S | S |
| F | VF | F | VS | VS |
| VF | VF | F | VS | VS |

T<sub>AMB</sub>

D<sub>TAMB</sub>

OUTSIDE TEMPERATURE (TAMB)

| INSIDE TEMPERATURE (TINC) | | VC | C | NT | H |
|---|---|---|---|---|---|
| | VC | F | F | F | F |
| | C | F | F | F | F |
| | G | F | F | HF | HF |
| | H | F | HF | HF | R |
| | VH | F | F | R | R |

OUTSIDE TEMPERATURE ($T_{AMB}$)

|  |  | VC | C | NT | H |
|---|---|---|---|---|---|
| SOLAR RADIATION QUANTITY ($Q_{SUN}$) | L | F | F | HF | R |
|  | LM | F | F | HF | R |
|  | M | F | HF | R | R |

SET TEMPERATURE
CORRECTION AMOUNT
(TAPTC)

|  | C | NT | H |
|---|---|---|---|
| L | L | L | L |
| LM | LM | LM | L |
| M | M | LM | L |

SOLAR
REDIATION
QUANTITY
(QSUN)

SOLAR RADIATION QUANTITY ($Q_{SUN}$)

| | | | |
|---|---|---|---|
| L | LM | M | M |
| C | LM | M | M |
| NT | LM | LM | M |
| H | L | L | LM |

OUTSIDE TEMPERATURE ($T_{AMB}$)

INSIDE TEMPERATURE (°C)
(TINC)

| | INSIDE TEMPERATURE (TINC) | | | | |
|---|---|---|---|---|---|
| | VC | C | G | H | VH |
| VC | UP | UP | NT | DN | DN |
| C | UP | UP | UP | NT | NT |
| G | UP | UP | NT | NT | NT |
| H | NT | NT | NT | DN | DN |
| VH | NT | NT | NT | DN | DN |

INTAKE AIR TEMPERATURE (TINT)

COMPUTER-CONTROLLED AUTOMOTIVE AIR CONDITIONING SYSTEM WITH FUZZY INFERENCE

BACKGROUND OF THE INVENTION

1. Field of the Invention

The present invention relates in general to automotive air conditioning systems and more particularly to computer-controlled automotive air conditioning systems. More specifically, the present invention is concerned with computer-controlled automotive air conditioning systems of a type which uses a fuzzy system theory for controlling the operation of the system.

2. Description of the Prior art

Hitherto, various types of computer-controlled air conditioning systems have been proposed and put into practical use particularly in the field of motor vehicles. Such conventional automotive air conditioning systems are almost of a type which uses a computer operated on PID control (viz., Proportional plus Integral plus Derivative Control).

In order to clarify the task of the present invention, one conventional computer-controlled automotive air conditioning system of such PID control will be described in brief with reference to FIG. 63 of the accompanying drawings.

Referring to FIG. 63 of the accompanying drawings, there is schematically shown a control system of the conventional automotive air conditioning system, which is arranged to control the output power of an electric air blower 25 in accordance with information signals issued from various sensors and control switches. The air blower 25 is used for blowing a temperature-controlled air into the passenger room from an air conditioning unit.

In FIG. 63, denoted by numeral 1 is a switch "A/C" for energizing an air conditioning unit of the system, and denoted by numeral 2 is a switch "AUTO" for forcing the air conditioning unit to assume an automatic mode. Denoted by numeral 3 is a temperature sensor for detecting the temperature of the engine cooling water, and denoted by numeral 4 is a sensor "PBR" for detecting a pivot angle of an air-mix door. The air mix-door is pivotally installed in an air-mix chamber in which cold air and hot air are introduced. Thus, when the pivot angle of the air mix-door varies, the mixing rate of the hot and cold air changes thereby changing the temperature of the mixed air discharged from the air-mix chamber. Denoted by numeral 5 is a solar radiation sensor for sensing the quantity of solar radiation pouring on the vehicle body. Denoted by numeral 6 is an outside temperature sensor which senses the temperature of the surrounding air, and denoted by numeral 7 is an inside temperature sensor which senses the temperature of air in the passenger room. Denoted by numeral 8 is a blower speed control switch which, when manually handled, can fix the rotation speed of the blower motor 25 at a desired given level. Denoted by numeral 9 is a mode selection switch which selects the mode of the automatic air conditioning. More specifically, when the mode selection switch 9 is manipulated, air blowing apertures exposed to the passenger room are selected. Denoted by numeral 10 is a temperature setter switch which is manipulated by the passengers when they wish to change the room temperature.

Signals issued by the above-mentioned various sensor means 1 to 10 are introduced into a control unit 15 which comprises an input signal processing part 16, a temperature setting part 7, a temperature signal correction part 18, a microcomputer 19 and an output signal processing part 20. The signals from the sensor means 1 to 9 are fed to the input signal processing part 16, and the signal from the temperature setter switch 10 is fed to the temperature setting part 17. The signal outputted from the temperature setting part 17 is corrected by the temperature signal correcting part 18. By analyzing signals from the input signal processing part 16 and the temperature signal correction part 18, the microcomputer 19 outputs to the output signal processing part 20 a signal representative of a voltage suitable for operating the electric air blower 25. Upon receiving the signal from the microcomputer 19, the output signal processing part 20 outputs a switching signal for a transistor 22 and a control signal for another transistor 23. The voltage actually applied to the electric air blower 25 is controlled by these two transistors 22 and 23. That is, when the transistor 22 is switched ON, a relay 24 assumes ON condition. Under this condition, the electric air blower 25 runs at a high speed. While, when, with the transistor 22 being kept OFF, the other transistor 23 is in operation, the voltage actually applied to the electric air blower 25 varies in accordance with a voltage applied to the base of the transistor 23 by the output signal processing part 20. Accordingly, under this condition, the rotation speed of the blower 25 varies in accordance with the voltage of the base.

However, due to its inherent construction, the above-mentioned computer-controlled automotive air conditioning system has the following drawbacks.

(1) It is difficult to precisely control the rotation speed of the electric air blower 25 in accordance with a change in the environment which surrounds the vehicle. In fact, even when the environment of the vehicle changes, the rotation speed of the blower 25 is kept unchanged so long as the air-mix door keeps the same angular position.

(2) In the above-mentioned type of the air conditioning system, it tends to occur that the control of the system is oversensitive to the quantity of solar radiation. That is, in such type, each time the vehicle runs into or from the shadows of trees and clouds, the control mode is forced to meaninglessly change.

(3) In a type wherein a delayed control takes place when the temperature of the outside air is rising, such control may take place when the vehicle runs down from a higher place of lower temperature to a lower place of higher temperature. Of course, such delayed control is not necessary under such down-hill cruising.

(4) It is difficult to control the air conditioning system in accordance with the sensitivity or feeling possessed by the passengers. That is, in summer, it is preferable to make the fluctuation of the room temperature smaller than in winter upon changing a target room temperature, because in summer the passengers are thinly dressed and thus much sensitive to the temperature. However, the conventional control can not deal with this preferability.

(5) In a type wherein an intake door is installed in an outside air induction passage for varying the amount of outside air fed to the passenger room in accordance with an instruction from the computer 19, tuning of the intake door is difficult. If the tuning is improperly made, undesired "cycling" phenomenon tends to occur. That is, in such case, switching between outside air induction mode and inside air induction mode is overly and meaninglessly repeated.

(6) In the type wherein the temperature of air blown into the passenger room is controlled using the quantity of solar radiation as a control parameter, it is usual to determine the target temperature of the air blown into the passenger room by linearly processing the quantity of solar radiation. However, this linear processing tends to cause the temperature actually provided in the passenger room to differ from the temperature to which the feeling of passengers matches. That is, to a passenger who can easily bear coolness, it is preferable to allow the temperature control of the air blowing to be somewhat largely affected by the quantity of solar radiation, and at the time when in winter the passenger room is warmed, it is also preferable to allow the temperature control of the blown air to be largely affected by the quantity of solar radiation for protecting the passengers from having a rush of blood to the head. However, the conventional control can not deal with such preferability.

(7) In a type wherein the control of the air conditioning system uses as one parameter the temperature sensed by a temperature sensor installed in an aspirator duct through which the air in the passenger room flows back to the air conditioning unit, it tends to occur that due to the thermal capacity possessed by the aspirator duct the temperature sensor fails to make a prompt reply to a temperature change of the air which is flowing in the aspirator duct. That is, it takes a little time until the temperature sensor issues a signal which represents the exact temperature of the air. This causes a delayed control of the air conditioning system.

SUMMARY OF THE INVENTION

It is therefore an object of the present invention to provide a computer-controlled automotive air conditioning system which is free of the above-mentioned drawbacks.

According to the present invention, there is provided a computer-controlled automotive air conditioning system of a type which uses a fuzzy system theory for controlling operation of the system.

According to the present invention, there is provided a computer-controlled automotive air conditioning system which comprises an air conditioning unit which, when operated, produces a conditioned air fed to a passenger room of the vehicle; an outside temperature sensor issuing a first signal representative of the temperature of surrounding air of the vehicle; an inside temperature sensor issuing a second signal representative of the temperature of air in a passenger room of the vehicle; a temperature setter switch which issues a third signal for setting the temperature in the passenger room when manipulated; a solar radiation sensor issuing a fourth signal representative of the quantity of solar radiation pouring on the vehicle; an intake air temperature sensor issuing a fifth signal representative of the temperature of air flowing in the air conditioning unit; a computer-installed control unit for controlling operation of the air conditioning unit in accordance with the first, second, third, fourth and fifth signals; and means for operating the control unit under a fuzzy system theory so that the magnitude of at least one of the first, second, third, fourth and fifth signals is divided into a predetermined number of fuzzy labels of membership function to derive a parameter for operation of the air conditioning unit.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Referring to FIGS. 1 to 7, there is shown a first embodiment of the present invention, which is a computer-controlled automotive air conditioning system using a fuzzy system theory.

Figure 1:
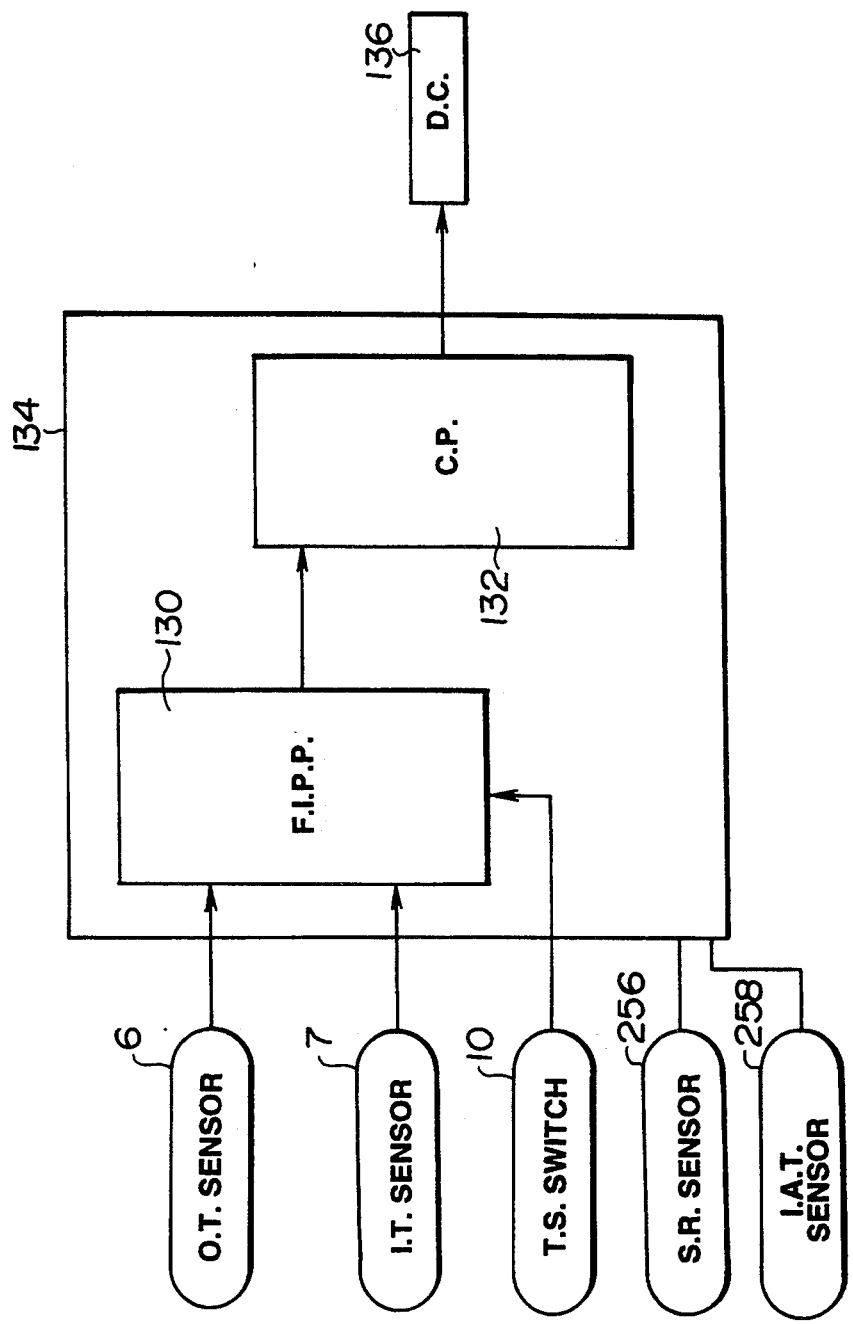
FIG. 1 is a block diagram showing a computer-controlled automotive air conditioning system, which is a first embodiment of the present invention.

FIG. 1 is a block diagram which shows only parts necessitated for explaining the control of an electric air blower by which the temperature-controlled air is blown into the passenger room.

An outside temperature sensor 6 is mounted to a front portion of an associated motor vehicle (not shown) near a bumper, which senses the temperature of the surrounding air. An inside temperature sensor 7 is installed in a passenger room to detect the temperature of air in the passenger room. A temperature setter switch 10 is mounted on the instrument panel, which is manipulated by passengers when they wish to change the room temperature to a desired level.

A solar radiation sensor 256 and an intake air temperature sensor 258 are also employed, which produce corresponding signals fed to an input part of an aftermentioned microcomputer 134. The solar radiation sensor 256 senses the quantity of solar radiation pouring on the vehicle body, and the intake air temperature sensor 258 senses the temperature of air which flows just upstream of a heater core (230) of an air conditioning unit (210). The heater core (230), the air conditioning unit (210) and their arrangements will be understood from the drawing of FIG. 8.

Figure 2:
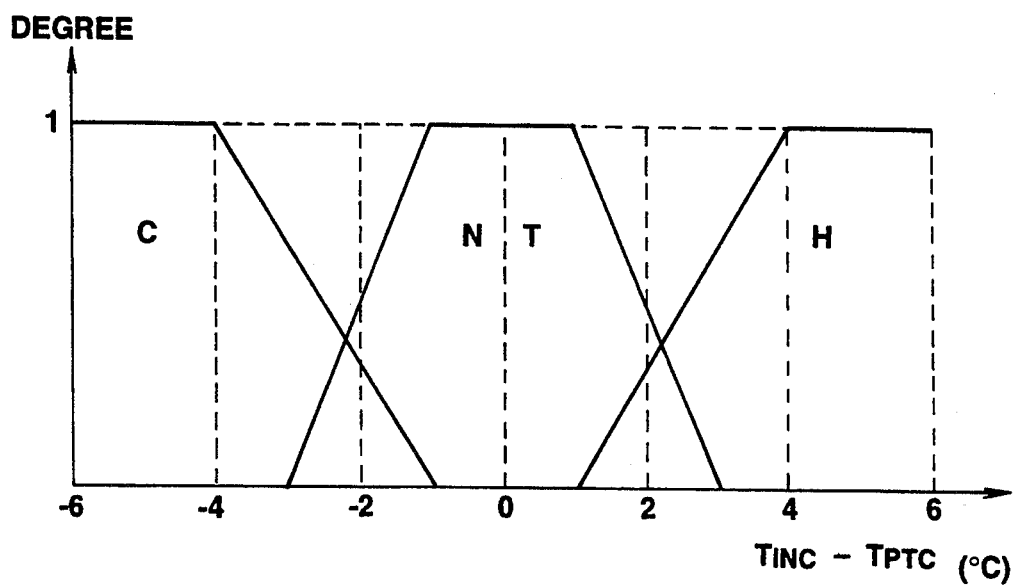
FIG. 2 is a graph of membership function, showing the classification in fuzzy label of a calculated room temperature balance, which is employed in the first embodiment.
Figure 3:
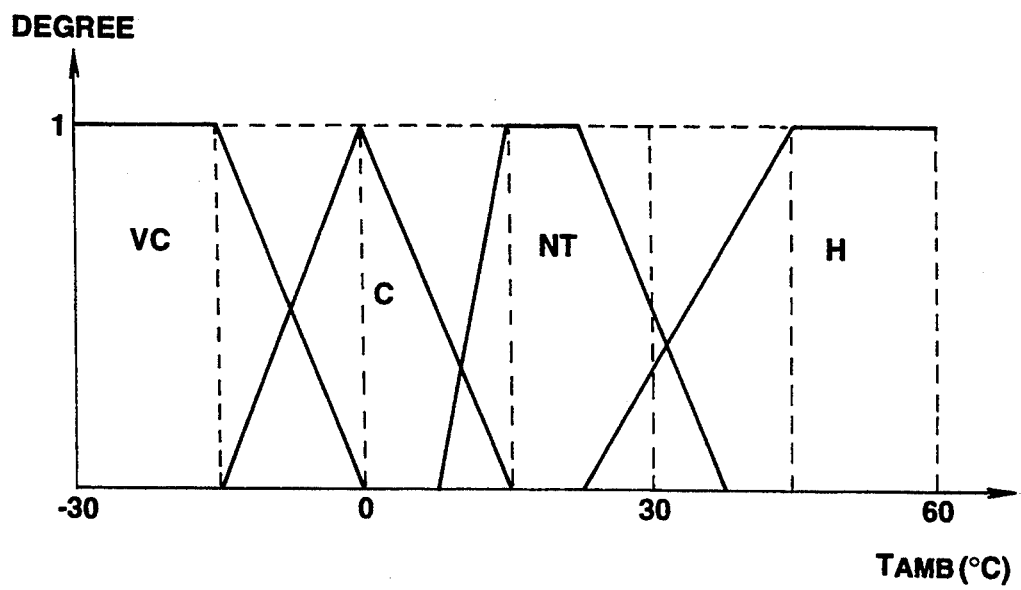
FIG. 3 is a graph of membership function, showing the classification in fuzzy label of outside temperature, which is employed in the first embodiment.

Designated by numeral 130 in FIG. 1 is a fuzzy inference processing part, which has a ROM for memorizing membership functions related to a room temperature balance and an outside temperature, which are shown in FIGS. 2 and 3.

From the signal "TINC" issued by the inside temperature sensor 7 and the signal "TPTC" issued by the temperature setter switch 10, the processing part 130 calculates the room temperature balance "TINC-TPTC". The signal "TAMB" issued by the outside temperature sensor 6 is also fed to the fuzzy inference processing part 130.

In the membership function graph of FIG. 2, the room temperature balance "TINC-TPTC" is represented by the axis of abscissa and the corresponding degree is represented by the axis of ordinate. In the membership function graph of FIG. 3, the outside temperature "TAMB" is represented by the axis of abscissa and the corresponding degree is represented by the axis of ordinate.

The detail of these membership functions will be described hereinafter.

Figures 4, 5:
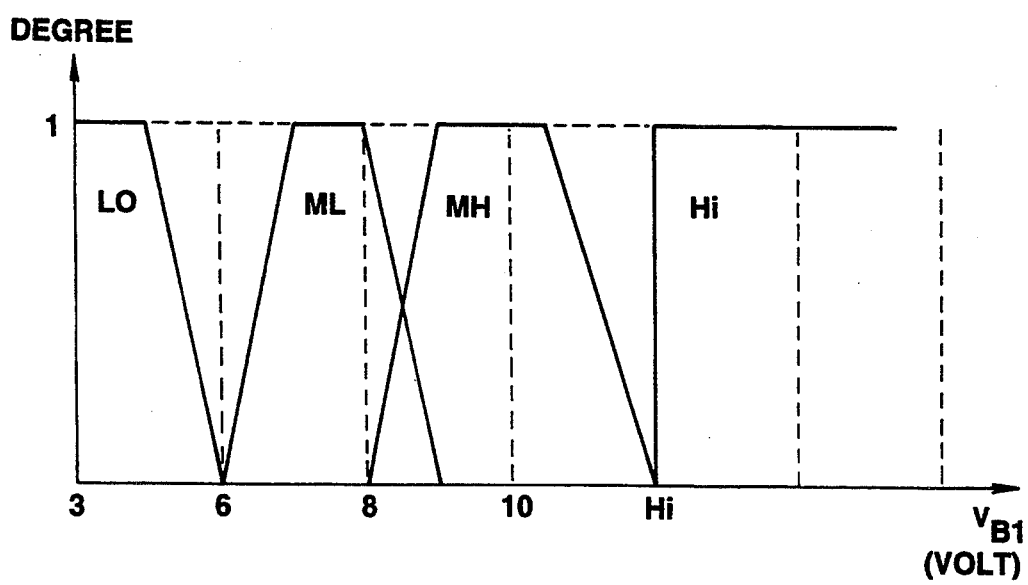
FIG. 4 is a fuzzy rule employed in the first embodiment.
FIG. 5 is a graph of membership function, showing the classification in fuzzy label of voltage applied to the blower motor, which is employed in the first embodiment.
Figure 63:
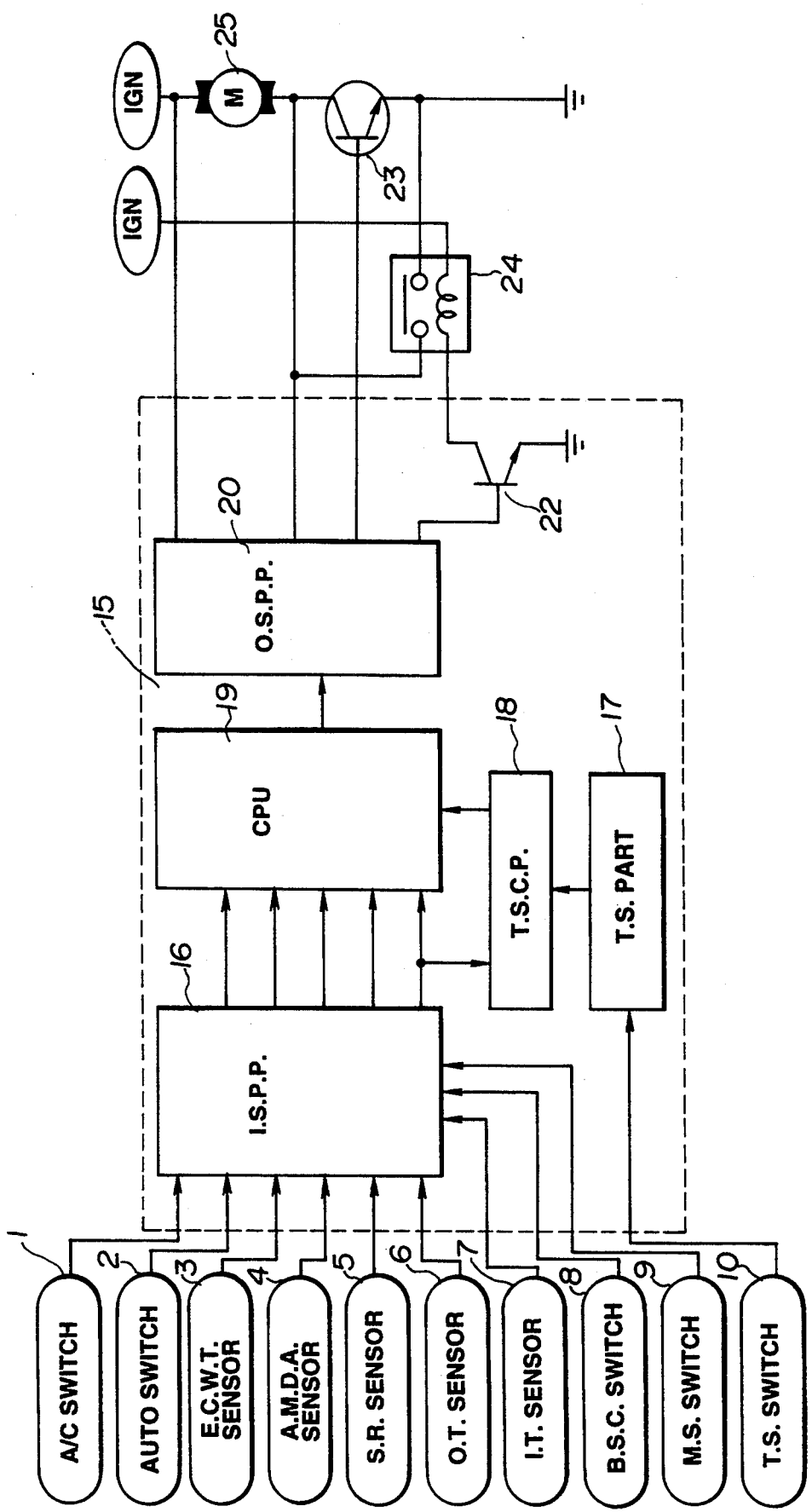
FIG. 63 is a schematic view of a control system of a conventional automotive air conditioning system which is operated on PID control system.

Designated by numeral 132 in FIG. 1 is a calculation part which calculates a voltage which should be applied to an electric air blower which corresponds to the blower 25 of FIG. 63. The calculation part 132 has a ROM which memorizes both a fuzzy rule as shown in FIG. 4 and a membership function as shown in FIG. 5. The membership function of FIG. 5 is related to the voltage which is to be applied to electric air blower 25. With reference to the fuzzy rule of FIG. 4 which shows the relationship between the outside temperature "TAMB" and the room temperature balance "TINC-TPTC", the calculating part 132 calculates the voltage suitable for operating the motor 25 of the air blower.

The processing part 130 and the calculation part 132 are involved in a microcomputer 134. The computer 134 outputs to a drive circuit 136 a signal which represents the voltage for the blower motor 25.

It is to be noted that the drive circuit 136 has substantially the same construction as a drive circuit of FIG. 63 which includes the output signal processing part 20, the transistors 22 and 23 and the relay 24.

Figure 6:
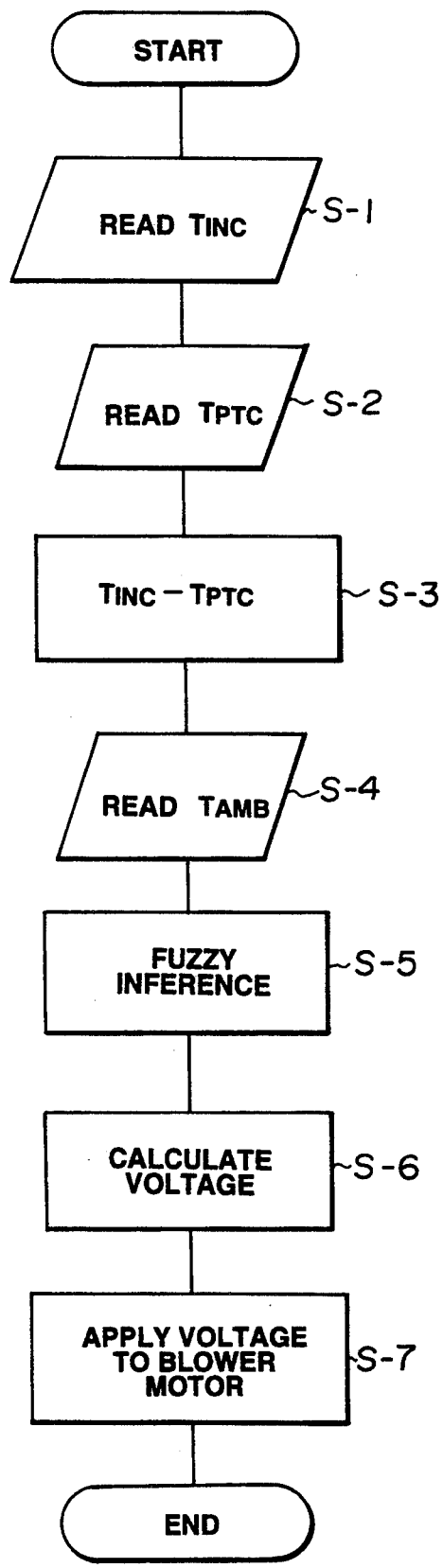
FIG. 6 is a flowchart showing programmed operation steps executed by a computer employed in the first embodiment.

In the following, operation of the air conditioning system of the first embodiment will be described with reference to the flowchart shown in FIG. 6.

At step S-1, the inside temperature "TINC" detected by the inside temperature sensor 7 is read, and at step S-2, the temperature "TPTC" set by the temperature setter switch 10 is read, and at step S-3, a calculation "TINC-TPTC" is carried out to derive the room temperature balance. Then, at step S-4, the outside temperature "TAMB" detected by the outside temperature sensor 6 is read.

At step S-5, a calculation on the fuzzy inference is carried out. That is, in the fuzzy inference processing part 130, a determination is carried out as to which fuzzy label (see FIG. 2) matches the room temperature balance "TINC-TPTC" thus calculated. As is seen from the graph of FIG. 2, three fuzzy labels are defined, which are a fuzzy label "cool (C)" provided when the room temperature balance is lower than −1° C., a fuzzy label "neutral (NT)" provided when the balance is within a range from −3° C. to 3° C., and a fuzzy label "hot (H)" provided when the balance is higher than 1° C. Accordingly, if, for example, the result of the calculation "TINC-TPTC" is −4° C., the fuzzy label "C" is selected judging that the inside temperature "TINC" is lower than the set temperature "TPTC". If the calculation result is put in an overlapped zone of the fuzzy labels, the overlapping degree is found or judged from the graph. That is, if, for example, the calculation result is −2° C., it is determined that the degree of the fuzzy label "C" is 35% and the degree of the fuzzy label "NT" is 65%.

Similar to the above, at the step S-5, in the fuzzy inference processing part 130, a determination is also carried out as to which fuzzy label (see FIG. 3) matches the outside temperature "TAMB" detected by the outside temperature sensor 6. As is seen from the graph of FIG. 3, four fuzzy labels are defined, which a fuzzy label "very cool (VC)" provided when the outside temperature "TAMB" is lower than 0° C., a fuzzy label "cool (C)" provided when the outside temperature "TAMB" is within a range from −15° C. to +15° C., a fuzzy label "neutral (NT)" provided when the outside temperature "TAMB" is within a range from 10° C. to 40° C., and a fuzzy label "hot (H)" provided when the outside temperature "TAMB" is higher than 20° C. Selection of the fuzzy labels on the detected outside temperature "TAMB" is carried out in substantially the same manner as in the case of the fuzzy labels of FIG. 2.

Then, at step S-6, calculation of voltage applied to the electric air blower 25 is carried out. That is, in the calculation part 132, based on the fuzzy label selected by the fuzzy inference processing part 130, the voltage for the air blower 25 is calculated or derived with reference to the rule table of FIG. 4 and the membership function graph of FIG. 5. That is, if, for example, the room temperature balance "TINC-TTPC" is determined as the fuzzy label "cool (C)" due to result "−4° C." of the calculation "TINC-TPTC" and the outside temperature "TAMB" is determined as the fuzzy label "neutral (NT)" due to value "15° C." which the outside temperature indicates, a fuzzy label "low voltage (Lo)" is selected from the rule table of FIG. 4. With this, about 4 V (volt) is applied to the electric air blower 25.

It is to be noted that in the rule table of FIG. 4, the marks "LO", "ML", "MH" and "HI" represent "low voltage", "slightly low voltage", "slightly high voltage" and "high voltage", respectively.

At step S-7, the voltage (viz., about 4 V) thus derived at step S-6 is actually applied to the electric air blower 25.

Figure 7:
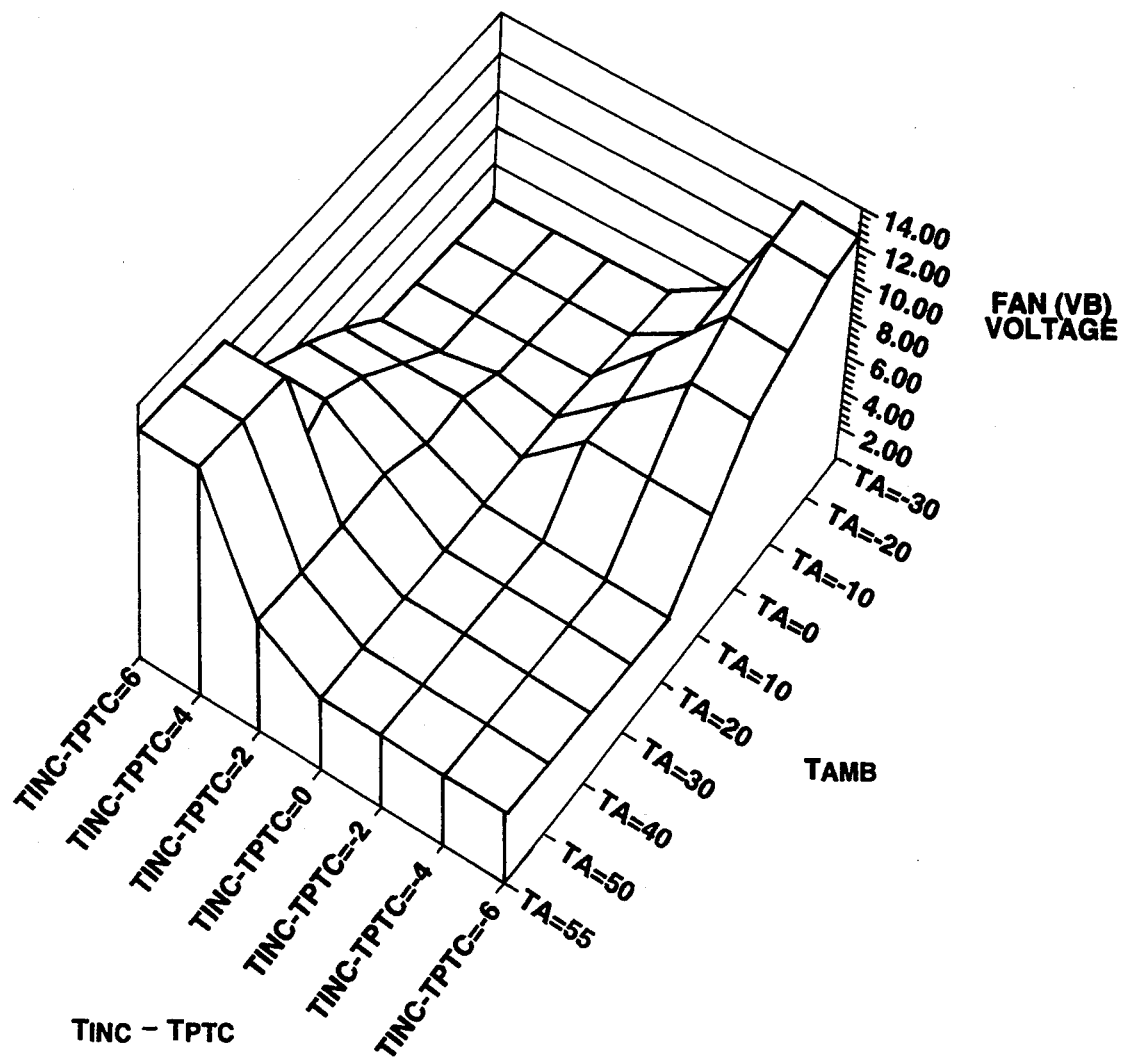
FIG. 7 is a three dimensional graph which shows in a three-dimensional manner the relationship between the three parameters used in the first embodiment.

FIG. 7 is a three dimensional graph which shows in a three-dimensional manner the relationship between the outside temperature "TAMB", the room temperature balance "TINC-TPTC" and the voltage which should be applied to the electric air blower 25.

As is seen from this graph, in this first embodiment, a very fine control is effected based on both the room temperature balance and the outside temperature. This means that the rotation speed of the electric air blower is appropriately varied in accordance with the change in environment of the associated motor vehicle. This feature is very advantageous when considering that in the afore-mentioned conventional computer-controlled automotive air conditioning system, the rotation speed of the blower 25 is kept unchanged so long as the air-mix door keeps the same angular position.

Referring to FIGS. 8 to 15, there is shown a computer-controlled automotive air conditioning system which is a second embodiment of the present invention.

Figure 8:
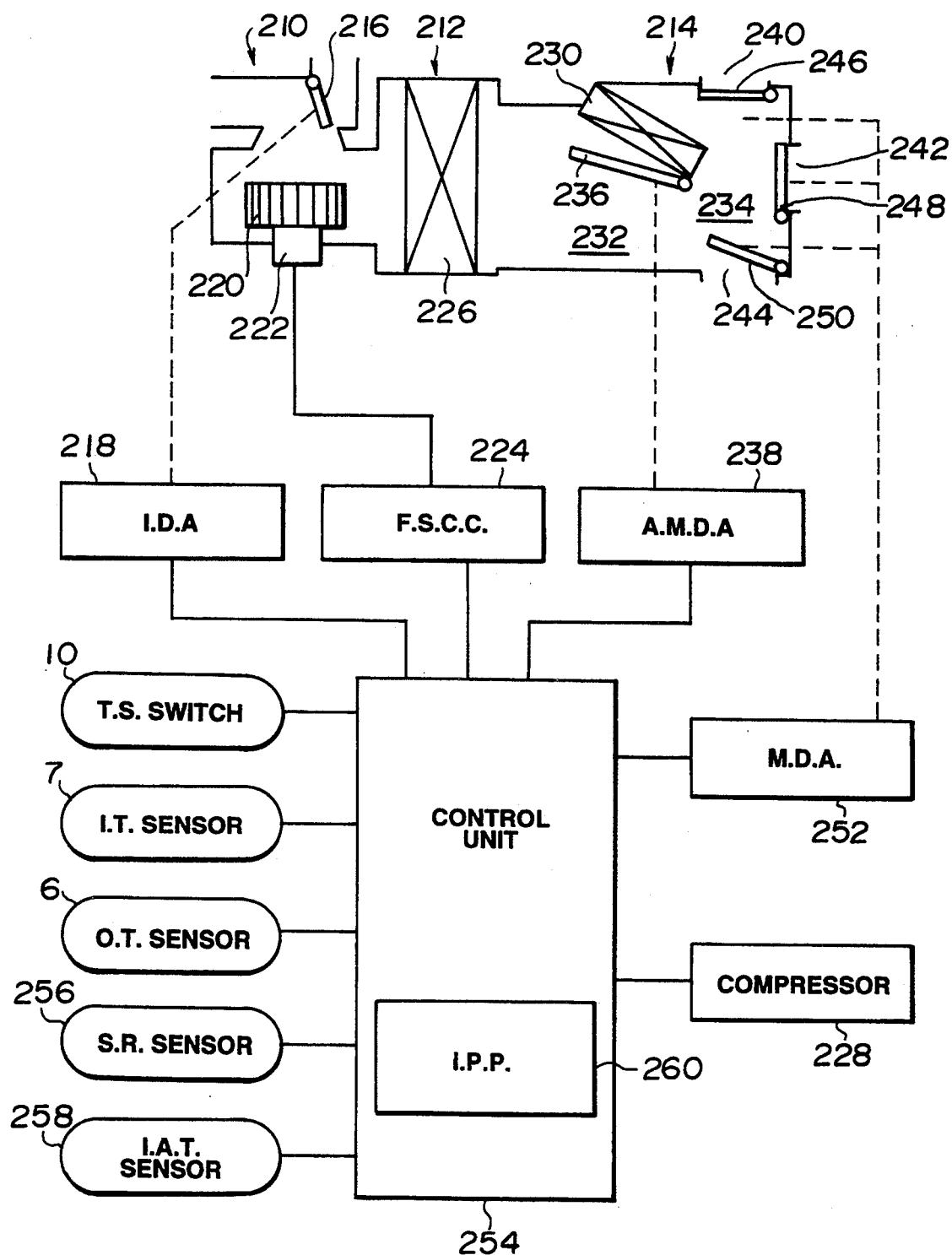
FIG. 8 is a schematic drawing showing a computer-controlled automotive air conditioning system, which is a second embodiment of the present invention.

As is seen from FIG. 8, the air conditioning system has an air conditioning unit which comprises an air intake unit 210 constructed to selectively intake outside air and inside air, a cooling unit 212 constructed and arranged to cool the intake air and a heater unit 214 constructed and arranged to heat the air from the cooling unit 212. As is described in the following, various doors are associated with the heater unit 214 to discharge conditioned air into a passenger room.

The air intake unit 210 has an intake door 216 pivotally installed therein in a manner to change the open degree of an outside air duct and/or an inside air duct. The pivotal movement of the intake door 216 is carried out by an intake door actuator 218. The air intake unit 210 has further a fan 220 driven by an electric motor 222. As is seen from the drawing, by changing the rotation speed of the motor 222, the amount of air fed to the passenger room is varied. The rotation speed of the motor 222 is controlled by a fan speed control circuit 224. As will be clarified hereinafter, for changing the rotation speed of the motor 222, the circuit 224 changes the voltage applied to the motor 222.

The cooling unit 212 comprises an evaporator 226 which constitutes a cooling cycle together with a compressor 228. When the compressor 228 is energized, compressed coolant is fed to the evaporator 226 to cool the air which surrounds the evaporator 226.

The heater unit 214 has a heater core 230 through which engine cooling water circulates. Near the heater core 230, there is arranged a bypass passage 232 which leads to an air-mix chamber 234 while bypassing the heater core 230. At an upstream side of the heater core 230, there is pivotally arranged an air-mix door 236 which can adjust the mixing rate between the air directed toward the heater core 230 and the air directed to the bypass passage 232. The pivotal movement of the air-mix door 236 is carried out by an air-mix door actuator 238. Thus, by changing the angular position of the air-mix door 236, the temperature of air fed to the passenger room is changed. That is, into the air-mix chamber 234, both the air heated by the heater core 230 and the air unheated in the bypass passage 232 are introduced in a mixing rate determined by the angular position of the air-mix door 236. The air-mix chamber 234 has three outlet openings 240, 242 and 244 which respectively lead to defroster nozzles exposed to a windshield, ventilation nozzles exposed to the passenger room and hoot portion nozzles exposed to a lower portion of the passenger room. The outlet openings 240, 242 and 244 are respectively equipped with pivot doors 246, 248 and 250 which are named as mode doors. These three doors 246, 248 and 250 are actuated through respective links by a mode door actuator 252.

The intake door actuator 218, the fan speed control circuit 224, the air-mix door actuator 238 and the mode door actuator 252 are connected to a control unit 254. As shown, a temperature setter switch 10, an inside temperature sensor 7, an outside temperature sensor 6, a solar radiation sensor 256 and an intake air temperature sensor 258 are connected to the control circuit 258 to feed the same with various information. The intake air temperature sensor 258 is arranged to detect the temperature of air which flows just upstream of the heater core 230. The intake door actuator 218, the air-mix door actuator 224 and the mode door actuator 252 have each a door position sensor or sensors by which the angular position or positions of a corresponding door or doors are sensed. Information on these angular positions of the doors are also fed to the control unit 254, as shown. The compressor 228 is equipped with a magnet clutch which is controlled by the control unit 254.

The control unit 254 is constructed of a microcomputer which, by analyzing the various information signals from the switch 10 and the sensors 7, 6, 256 and 258, controls the intake door actuator 5, the fan control circuit 224, the air-mix door actuator 238, the mode door actuator 252 and the compressor 228.

In this second embodiment, a so-called "solar radiation information processing part" 260 is involved in the control unit 254. As will be described in detail hereinafter, the information processing part 260 processes the signal issued by the solar radiation sensor 256.

Figure 9:
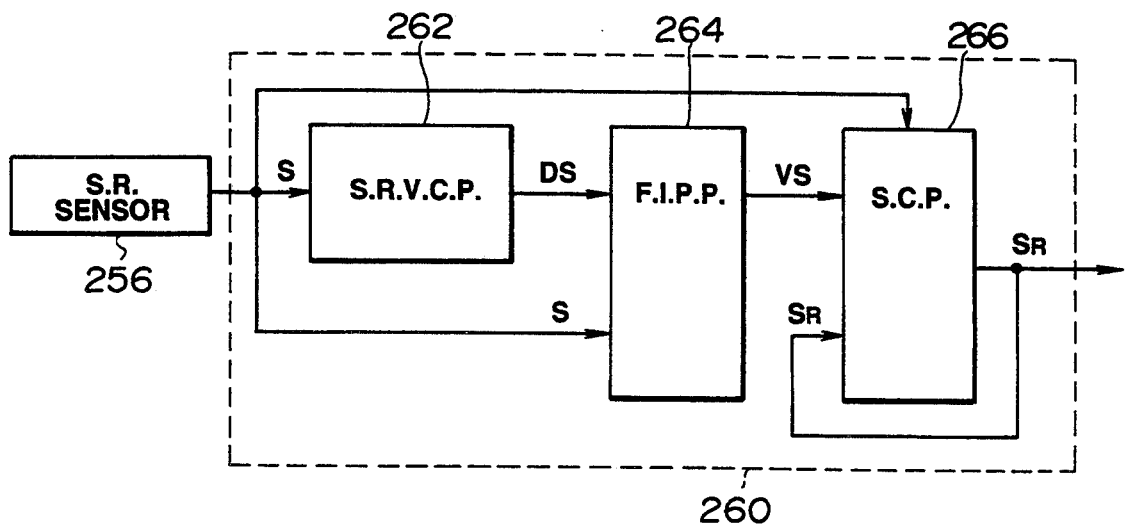
FIG. 9 is a block diagram showing an essential part of the second embodiment.

FIG. 9 is a block diagram which shows only parts necessitated for explaining the processing on the signal issued by the solar radiation sensor 256.

As shown, the solar radiation information processing part 260 generally comprises a solar radiation variation calculating part 262, a fuzzy inference processing part 264 and a signal composing part 266. By analyzing a signal (viz., the signal representing the quantity "S" of solar radiation) from the solar radiation sensor 256, the solar radiation variation calculating part 262 calculates a solar radiation variation "DS" per unit time. By analyzing the solar radiation variation "DS" per unit time and the quantity of solar radiation "S", the fuzzy inference processing part 264 infers a solar radiation correction amount "VS" in accordance with a predetermined fuzzy control rule. By analyzing the correction amount "VS" and a previous recognition solar radiation amount "SR", the signal composing part 266 calculates an updated recognition solar radiation amount "SR".

The solar radiation variation calculating part 262 comprises a differentiating circuit which, by differentiating the signal from the solar radiation sensor 256, derives the solar radiation variation "DS" per unit time (for example, 1 second).

The fuzzy inference processing part 264 comprises a ROM which stores membership functions for the fuzzy inference and a fuzzy inference section which stores a predetermined fuzzy rule. In this fuzzy inference section, based on the solar radiation quantity "S" and the solar radiation variation "DS" per unit time, the solar radiation correction amount "VS" per unit time (for example, per 1 second) is determined.

Figure 10:
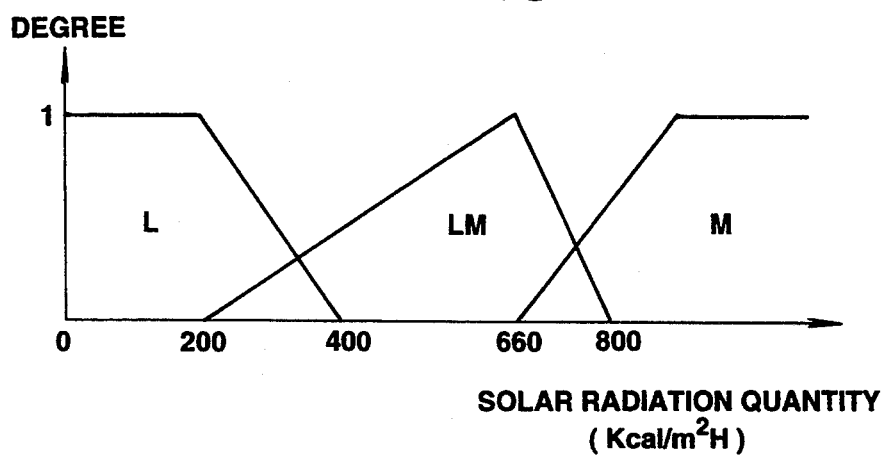
FIG. 10 is a graph of membership function, showing the classification in fuzzy label of quantity of solar radiation, which is employed in the second embodiment.
Figure 11:
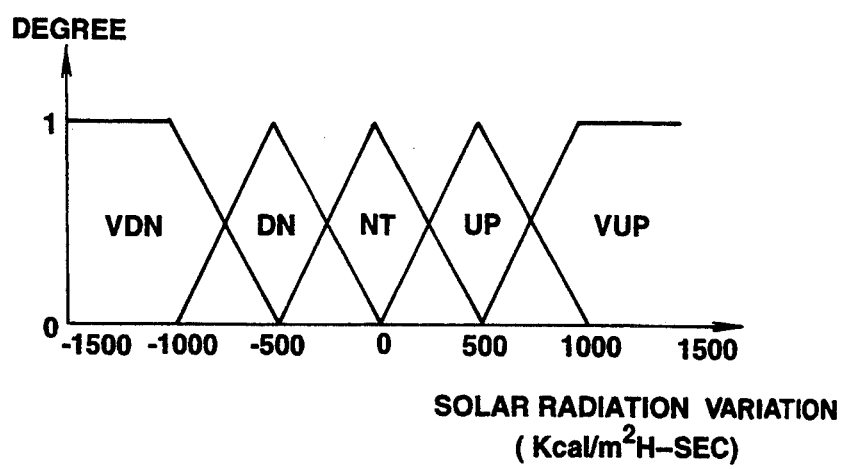
FIG. 11 is also a graph of membership function, showing the classification in fuzzy label of solar radiation variation, which is employed in the second embodiment.
Figures 12, 13:
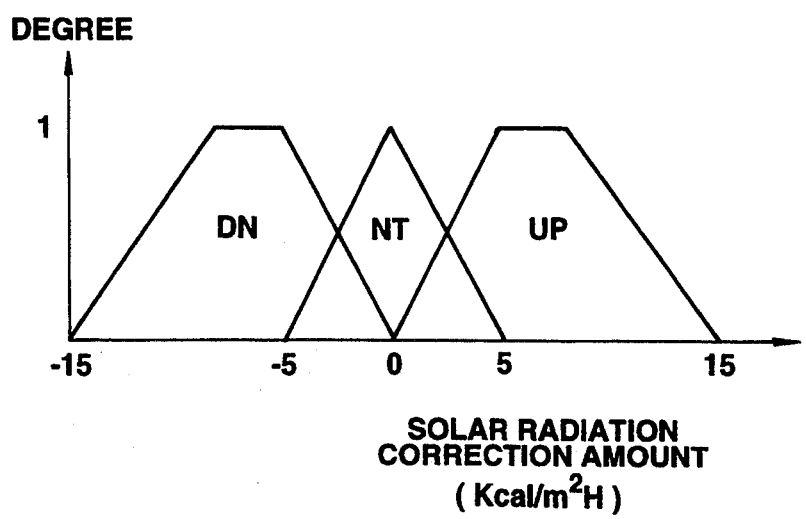
FIG. 12 is a graph of membership function, showing the classification in fuzzy label of solar radiation correction amount, which is employed in the second embodiment.
FIG. 13 is a table showing a fuzzy rule employed in the second embodiment.

The membership functions stored in the ROM are shown in FIGS. 10, 11 and 12.

The membership function shown in FIG. 10 is related to one antecedent parameter of an after-mentioned fuzzy rule. In the graph of FIG. 10, the solar radiation quantity "S" detected by the solar radiation sensor 256 is represented by the axis of abscissa and the corresponding degree is represented by the axis of ordinate. The degree is represented by a fuzzy label. That is, when the solar radiation quantity "S" is smaller than 400 Kcal/m²H, a fuzzy label "little (L)" is provided, when the quantity "S" is within a range from 200 Kcal/m²H to 800 Kcal/m²H, a fuzzy label "little much (LM)" is provided, and when the quantity "S" is larger than 660 Kcal/m²H, a fuzzy label "much (M)" is provided.

The membership function shown in FIG. 11 is related to another antecedent parameter of the fuzzy rule. In the graph of FIG. 11, the solar radiation variation "DS" per unit time is represented by the axis of abscissa and the corresponding degree is represented by the axis of ordinate. When the solar radiation variation "DS" is smaller than $-500$ Kcal/sec., a fuzzy label "very reduced (VDN)" is provided, when the variation "DS" is within a range from $-500$ Kcal/sec. to $+500$ Kcal/sec., a fuzzy label "unchanged (NT)" is provided, when the variation "DS" is within a range from 0 to $+1000$ Kcal/sec., a fuzzy label "increased (UP)" is provided, and when the variation "DS" is larger than $+500$ Kcal/sec., a fuzzy label "very increased (VUP)" is provided.

The membership function shown in FIG. 12 is related to a consequent parameter of the fuzzy rule. In this graph, the solar radiation correction amount "VS" is represented by the axis of abscissa and the corresponding degree is represented by the axis of ordinate. When the correction amount "VS" is within a range from $-15$ Kcal/m²H to 0 Kcal/m²H, a fuzzy label "decrease (DN)" is provided, when the correction amount "VS" is within a range from $-5$ Kcal/m²H to $+5$ Kcal/m²H, a fuzzy label "not change (NT)" is provided and when the correction amount "VS" is within a range from 0 to $+15$ Kcal/m²H, a fuzzy label "increase (UP)" is provided.

Furthermore, in the second embodiment, such a fuzzy rule as shown in FIG. 13 is stored in the ROM of the fuzzy inference processing part 264.

It is to be noted that the above-mentioned membership functions and the fuzzy rule should be determined in accordance with various experiments. For example, the variation in solar radiation effected when an associated motor vehicle runs into or out from a tunnel and that effected when the vehicle runs on an open area are both tested to make up a fuzzy rule through which such two variations can be distinguished from each other and an optimum corresponding degree in recognition solar radiation amount for each case can be obtained.

In the fuzzy inference processing part 264, based on the membership functions shown in the graphs of FIGS. 10 to 12 and the fuzzy rule shown in FIG. 13, a fuzzy inference is carried out in order to derive the solar radiation correction amount "VS" of solar radiation.

Figure 14:
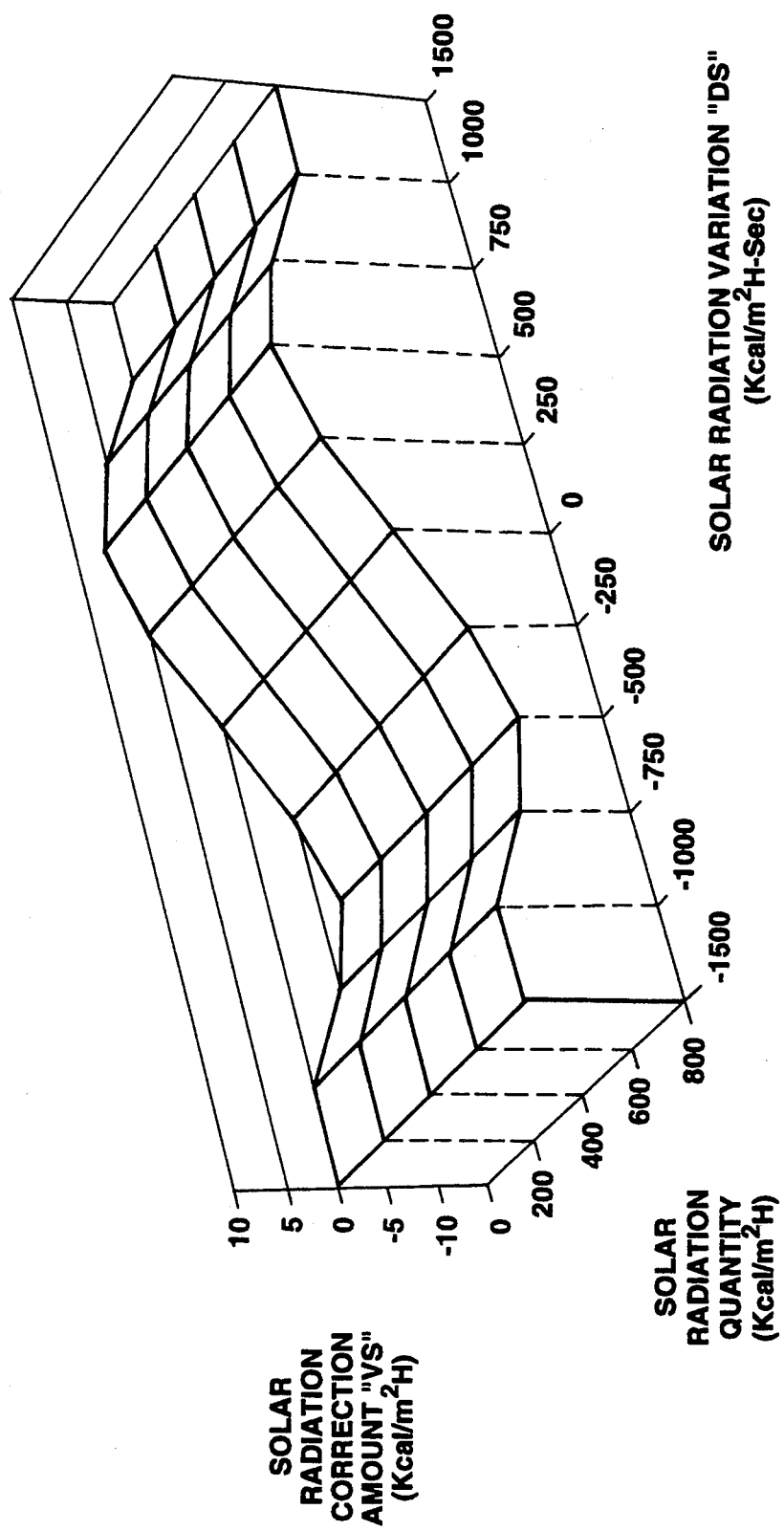
FIG. 14 is a three dimensional graph showing in a three-dimensional manner the relationship of the three parameters used in the second embodiment.

FIG. 14 is a three dimensional graph which shows in a three-dimensional manner the relationship between the solar radiation amount "S", the solar radiation variation "DS" and the correction solar variation amount "VS".

The signal composing part 266 comprises an integrating circuit which, by adding the solar variation correcting amount "VS" and a previous recognition solar radiation amount "SR" every second, calculates an updated recognition solar radiation amount "SR". That is, with usage of an equation "SR=SR+VS", the updated recognition solar radiation amount SR is derived, which is outputted to a control part of the signal composing part 266.

Figure 15:
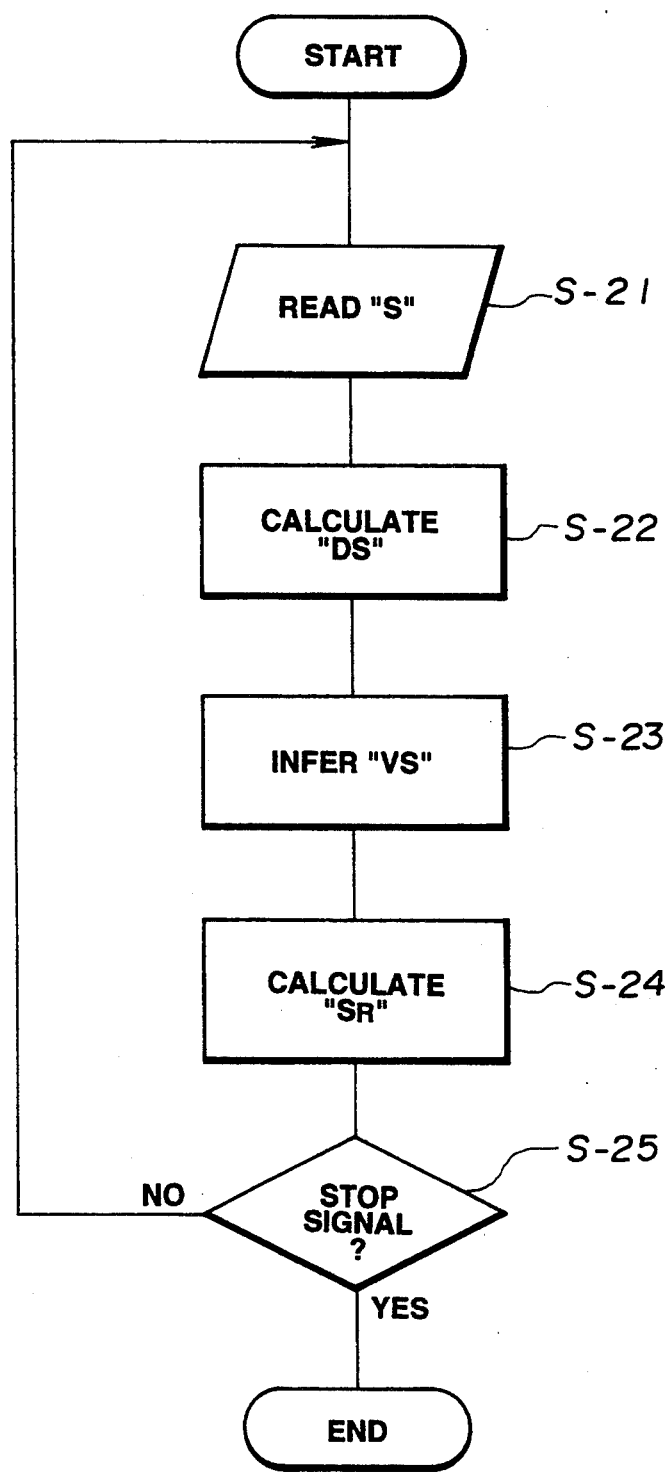
FIG. 15 is a flowchart showing programmed operation steps executed by a computer employed in the second embodiment.

In the following, operation of the air conditioning system of the second embodiment will be described with reference to the flowchart shown in FIG. 15. At step S-21, the solar radiation quantity "S" detected by the solar radiation sensor 256 is read, and at step S-22, the solar radiation variation "DS" per unit time is calculated. Then, at step S-23, the solar radiation correction amount "VS" is inferred from the values "S" and "DS" using the predetermined fuzzy control rule. At step S-24, an up-dated recognition solar radiation amount "SR" is calculated by using the equation "SR=SR+VS", which is replaced with a previous value "SR" stored in the memory section. At step S-25, a judgment is carried out as to whether a stop signal for stopping the operation of the air conditioning system is issued or not. If No, the operation flow goes back to step S-21, while if Yes, the flow stops.

As will be understood from the above, in the second embodiment, by using membership functions for the parameters "S", "DS" and "VS" and a predetermined fuzzy rule, a solar radiation correction amount "VS" is derived and a recognition solar radiation amount "SR" is derived based on the derived value "VS". That is, in the second embodiment, the solar radiation correction amount "VS" which is controlled by the solar radiation variation "DS" per unit time is used for obtaining the recognition solar radiation amount "SR". This means that the responsibility of the recognition solar radiation amount "SR" fits the feeling of the passengers. That is, in a case wherein the vehicle runs into or out from a tunnel, the solar radiation variation "DS" per unit time is relatively large and thus the correction amount "VS" of solar radiation is relatively large. Thus, under this condition, the recognition solar radiation amount "SR" reacts quickly to the detected solar radiation "S". This means that switching control of the air conditioning is frequently effected. While, in a case wherein the vehicle runs into or out from the shadows of trees and clouds, the solar radiation variation "DS" per unit time is relatively small and thus the correction amount "VS" of solar radiation is relatively small. Thus, under this condition, the recognition solar radiation amount "SR" reacts relatively slowly to the detected solar radiation "S". This means that excessively sensitive and meaningless responsibility of the air conditioning control to the change of the solar radiation is avoided.

Referring to FIGS. 16 to 23, there is shown a computer-controlled automotive air conditioning system which is a third embodiment of the present invention.

Since this third embodiment is similar to the above-mentioned second embodiment, only portions and arrangements which are different from those of the second embodiment will be described in detail in the following for simplification of the description.

Figure 16:
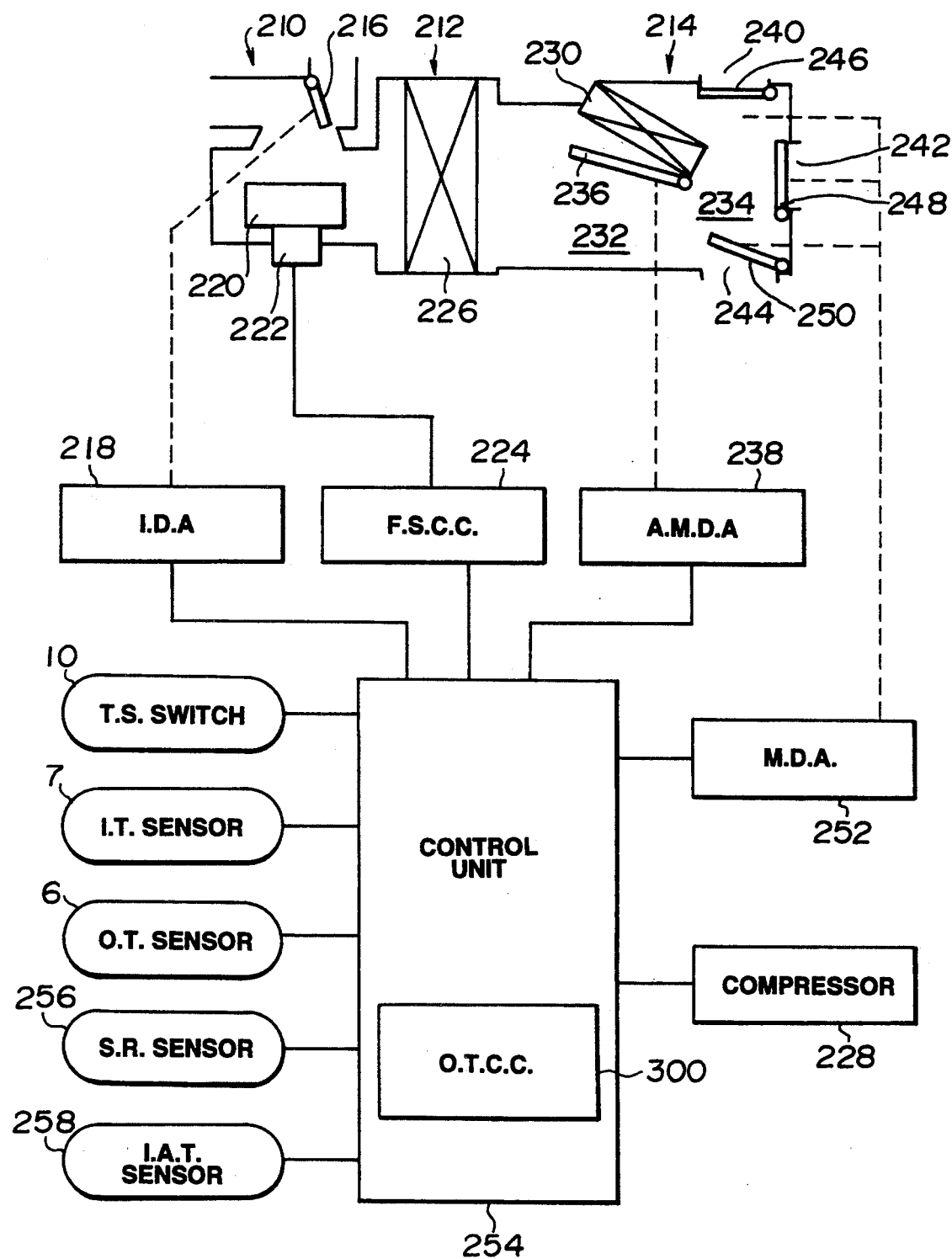
FIG. 16 is a schematic drawing showing a computer-controlled automotive air conditioning system, which is a third embodiment of the present invention.

As will be seen from FIG. 16, the air conditioning system of the third embodiment comprises substantially the same parts as those of the second embodiment of FIG. 8, except the control unit 254. It is to be noted that the same parts are denoted by the same numerals.

In the third embodiment, a so-called "outside temperature information correcting circuit" 300 is involved in the control unit 254. As will be described in detail hereinafter, the circuit 300 corrects the temperature detected by the outside temperature sensor 6 when the temperature is raising.

Figure 17:
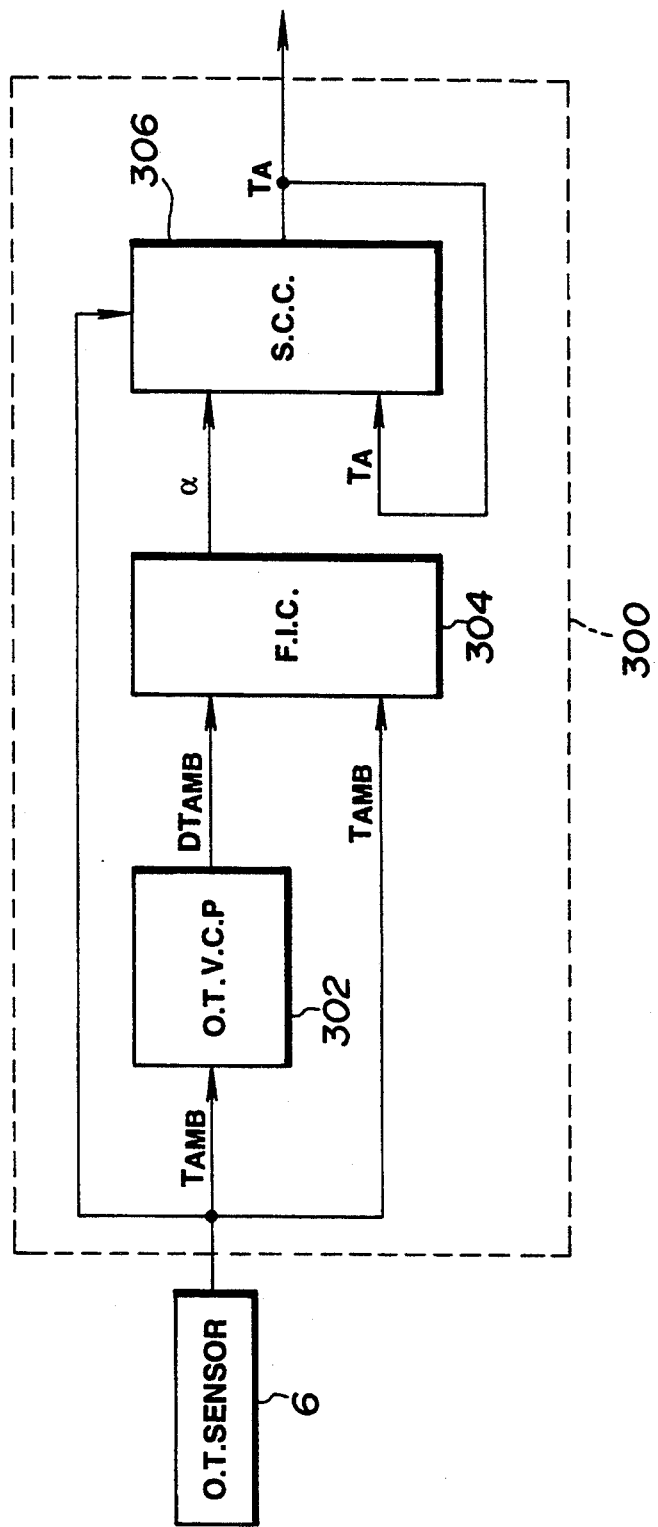
FIG. 17 is a block diagram showing an essential part of the third embodiment.

FIG. 17 is a block diagram which shows only parts necessitated for explaining the essence of the third embodiment. As shown, the outside temperature information correcting circuit 300 comprises an outside temperature variation calculating part 302, a fuzzy inference processing part 304 and a signal composing part 306. By analyzing a signal (viz., the signal representing the outside temperature "TAMB") from the outside temperature sensor 6, the variation calculating part 302 calculates an outside temperature variation "DTAMB" per unit time. By analyzing the outside temperature variation "DTAMB" per unit time and the detected outside temperature "TAMB", the fuzzy inference processing part 304 infers an outside temperature correction amount "α" in accordance with a predetermined fuzzy control rule. By analyzing the correction amount "α" and a previous parameter "TA", the signal composing part 306 calculates an up-dated parameter "TA". The value of the up-dated parameter "TA" corresponds to a recognition temperature, as will be clarified hereinafter.

The outside temperature variation calculating part 302 comprises a differentiating circuit which, by differentiating the signal from the outside temperature sensor 6, derives the outside temperature variation "DTAMB" per unit time (for example, one minute).

The fuzzy inference processing part 304 comprises a ROM which stores membership functions for the fuzzy inference and a fuzzy inference section which stores predetermined fuzzy rules. In this fuzzy inference section, based on the detected outside temperature TAMB and the outside temperature variation "DTAMB" per unit time, the outside temperature correction amount "α" per unit time (for example, 1 minute) is determined in accordance with a predetermined fuzzy control rule.

Figure 18:
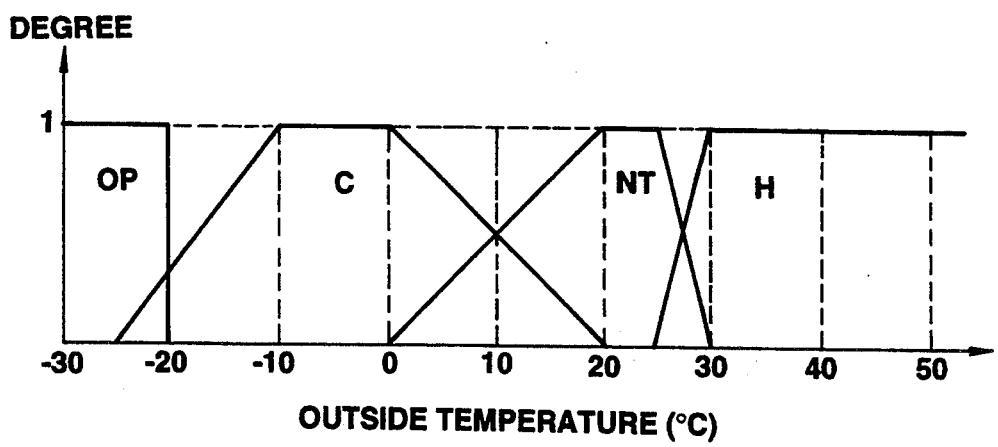
FIG. 18 is a graph of membership function, showing the classification in fuzzy label of outside temperature, which is employed in the third embodiment.
Figure 19:
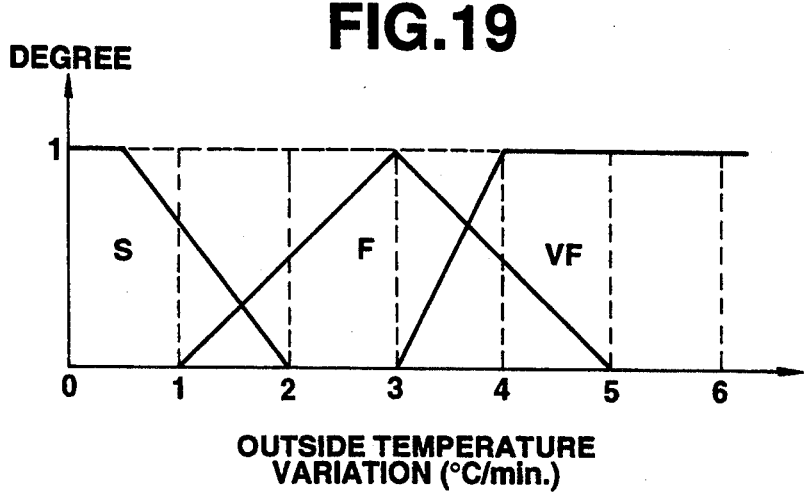
FIG. 19 is also a graph of membership function, showing the classification in fuzzy label of outside temperature variation, which is employed in the third embodiment.
Figure 20:
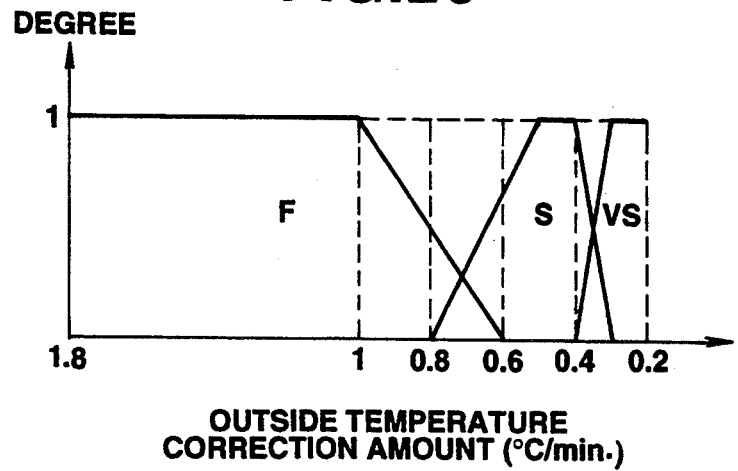
FIG. 20 is a graph of membership function, showing the classification in fuzzy label of outside temperature correction amount, which is employed in the third embodiment.

In this third embodiment, the ROM stores membership functions which are shown in FIGS. 18, 19 and 20.

The membership function shown in FIG. 18 is related to an antecedent parameter of an after-mentioned fuzzy rule. In the graph of FIG. 18, the detected outside temperature "TAMB" is represented by the axis of abscissa and the corresponding degree is represented by the axis of ordinate. The degree is represented by a fuzzy label. That is, when the detected outside temperature "TAMB" is lower than −20° C., a fuzzy label "open (OP)" is provided, when the detected outside temperature "TAMB" is within a range from −25° C. to +20° C., a fuzzy label "cold (C)" is provided, when the detected outside temperature "TAMB" is within a range from 0 to 30° C., a fuzzy label "normal (NT)" is provided, and when the detected outside temperature "TAMB" is higher than 25° C, a fuzzy label "hot (H)" is provided. It is to be noted that the fuzzy label "open (OP)" is provided also when the outside temperature sensor 6 encounters a trouble, such as imperfect contact or the like. When the fuzzy label "open (OP)" is selected, an after-mentioned delayed control does not take place.

The membership function shown in FIG. 19 is related to another antecedent parameter of the fuzzy rule. In the graph of FIG. 19, the outside temperature variation "DTAMB" per unit time is represented by the axis of abscissa and the corresponding degree is represented by the axis of ordinate. When the outside temperature variation "DTAMB" is smaller than 2° C./min., a fuzzy label "slow (S)" is provided, when the outside temperature variation "DTAMB" is within a range from 1° C./min. to 5° C./min., a fuzzy label "fast (F)" is provided, and the outside temperature variation "DTAMB" is larger than 3° C./min., a fuzzy label "very fast (VF)" is provided.

The membership function shown in FIG. 20 is related to a consequent parameter of the fuzzy rule. In this graph, the outside temperature correction amount "α" per unit time is represented by the axis of abscissa and the corresponding degree is represented by the axis of ordinate. When the correction amount "α" is smaller than 0.4° C./min., a fuzzy label "very slow (VS)" is provided, when the correction amount "α" is within a range from 0.3° C./min. to 0.8° C./min., a fuzzy label "slow (S)" is provided, and when the correction amount "α" is larger than 0.6° C./min., a fuzzy label "fast (F)" is provided.

Figures 21, 22:
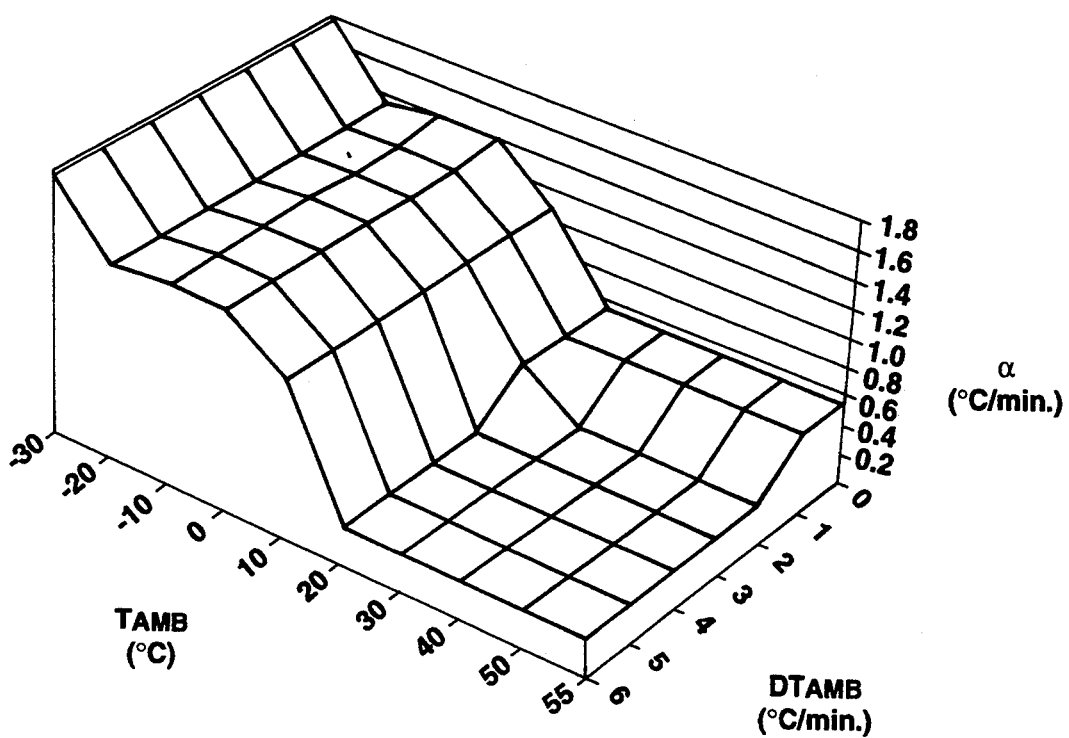
FIG. 21 is a table showing a fuzzy rule employed in the third embodiment.
FIG. 22 is a three dimensional graph showing in a three-dimensional manner the relationship of the three parameters used in the third embodiment.

Furthermore, in the third embodiment, such a fuzzy rule as shown in FIG. 21 is stored in the ROM of the fuzzy inference processing part 304.

In the fuzzy rule employed in the third embodiment, when the detected outside temperature "TAMB" and the outside temperature variation "DTAMB" per unit time are both high, the outside temperature correction amount "α" is relatively small. This is because of a high possibility of occurrence wherein a heated air stored in a certain place is temporarily applied to the outside temperature sensor 6 causing the sensor 6 to output a signal representative of an improper outside temperature.

It is to be noted that the above-mentioned membership functions and the fuzzy rule should be determined in accordance with various experiments. For example, a type of temperature increase caused by a heated air stored in such certain place and another type of temperature increase caused by, for example, movement from a higher place to a lower place are tested to make up a fuzzy rule through which such two types of temperature increase can be distinguished from each others and an optimum corresponding degree in recognition temperature for each case can be obtained.

In the fuzzy inference processing part 304, based on the membership functions shown in the graphs of FIGS. 18 to 20 and the fuzzy rule shown in FIG. 21, fuzzy inference is carried out in order to derive the outside temperature correction amount "α".

FIG. 22 is a three dimensional graph which shows in a three-dimensional manner the relationship between the outside temperature "TAMB", the outside temperature variation "DTAMB" and the outside temperature correction amount "α". As will be seen from this graph, when the outside temperature "TAMB" and the outside temperature variation "DTAMB" are high, which may be caused by heated air stored in a certain place, the outside temperature correction amount "α" is small. In this case, a delayed control is carried out in such a manner that the recognition temperature slowly increases. In other cases, for example, when the vehicle moves from a higher place to a lower place, the outside temperature correction amount "α" becomes large, which improves the responsibility of the control for the air conditioning system.

The signal composing part 306 comprises an integrating circuit which, which by adding the outside temperature correction amount "α" and a previous parameter "TA" every minute, composes or calculates an updated parameter "TA". That is, with usage of an equation "TA=TA+α", the up-dated parameter "TA" is derived, which is outputted to a control part of the signal composing part 306.

Figure 23:
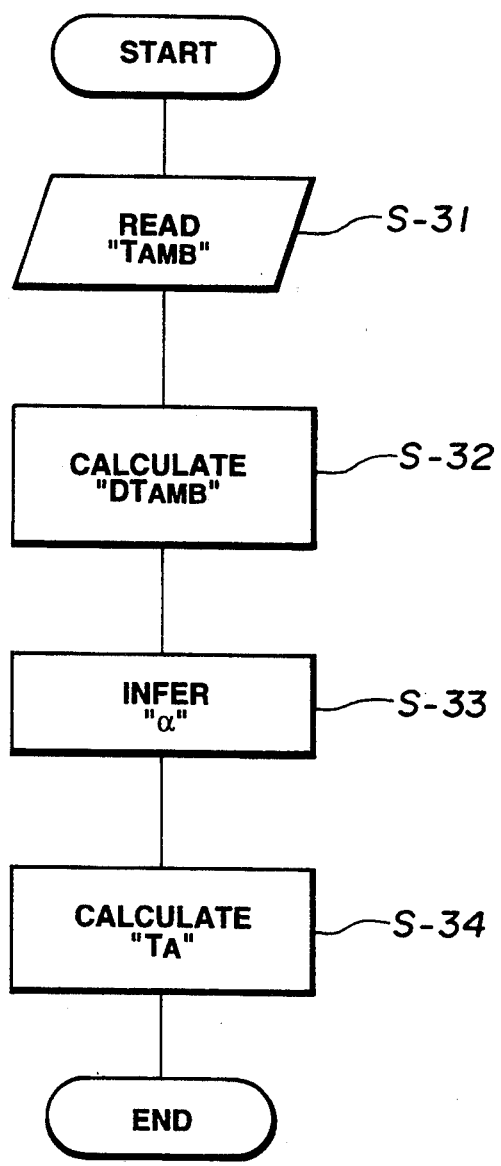
FIG. 23 is a flowchart showing programmed operation steps executed by a computer employed in the third embodiment.

In the following, operation of the air conditioning system of the third embodiment will be described with reference to the flowchart of FIG. 23.

At step S-31, the detected outside temperature "TAMB" is read, and at step S-32, the outside temperature variation "DTAMB" per unit time (viz., 1 minute) is derived. Then, at step S-33, the outside temperature correction amount "α" is inferred from the values "TAMB" and "DTAMB" using the predetermined fuzzy control rule. At step S-34, an up-dated parameter "TA" is calculated by using the equation "TA=-TA+α", which is replaced with a previous parameter "TA" stored in a memory section. The up-dated parameter "TA" represents a recognition temperature.

As will be understood from the above, in the third embodiment, by using membership functions for the parameters "TAMB", "DTAMB" and "α" and a predetermined fuzzy rule, an outside temperature correction amount "α" is derived and a recognition temperature (that is, up-dated parameter "TA") is derived based on the correction amount "α". In the third embodiment, the correction amount "α" can be selected in accordance with the environment of the vehicle. That is, the responsibility of the outside temperature sensor 6 can be non-linearly controlled in a manner to fit with the feeling of the passengers. That is, when the vehicle is running with the outside temperature gradually increasing, the control of the air conditioning system can be adjusted in accordance with the manner in which the outside temperature sensor 6 detects the temperature of the outside air. That is, when a high possibility is present wherein the temperature sensor 6 detects a heated air stored in a certain place of the vehicle, the correction amount "α" of outside temperature is determined small to avoid influence from such heated air. In this case, a delayed control is carried out in such a manner that the recognition temperature slowly increases. While, when the vehicle moves from a higher place to a lower place, the correction amount "α" is determined large to improve the responsibility of the control.

Referring to FIGS. 24 to 30, there is shown a fourth embodiment of the present invention.

Since the fourth embodiment is also similar to the above-described second embodiment, only portions and arrangements which are different from those of the second embodiment will be described in detail in the following.

Figure 24:
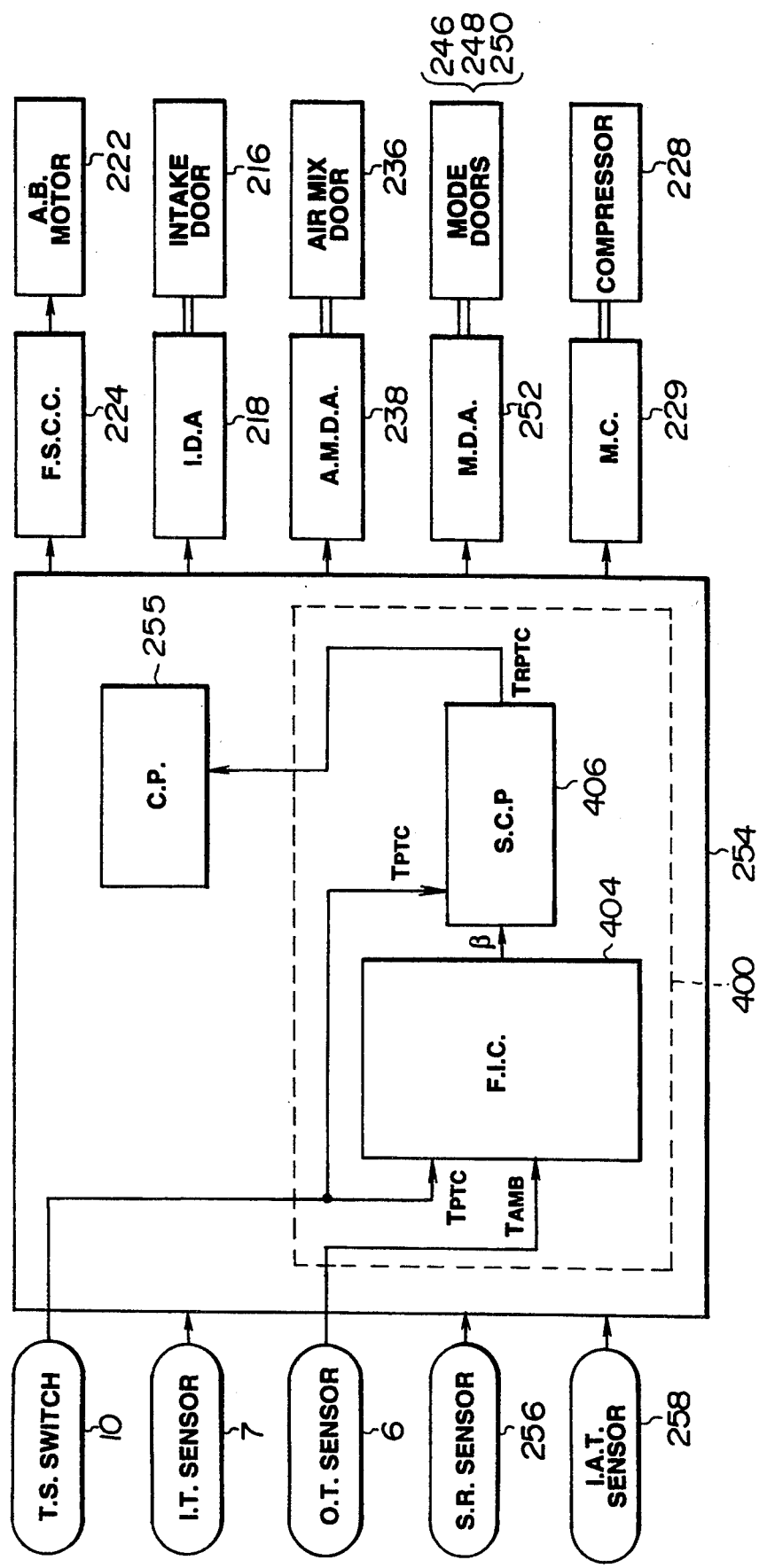
FIG. 24 is a block diagram showing a computer-controlled automotive air conditioning system, which is a fourth embodiment of the present invention.

As is seen from FIG. 24, the air conditioning system of the fourth embodiment comprises substantially the same parts as those of the second embodiment of FIG. 8 except the control unit 254. (In the drawing FIG. 24, the magnet clutch 229 for controlling the ON/OFF operation of the compressor 228 is shown.) The same parts are denoted by the same numerals.

In the fourth embodiment, a so-called "set temperature information correcting circuit" 400 is involved in the control unit 254. As will be described in detail hereinafter, the circuit 400 corrects the temperature set by the temperature setter switch 10. Designated by numeral 255 is a part of the control unit 254 which, by processing information signals issued from the switch 10 and the sensors 7, 6, 256 and 258, controls the fan speed control circuit 224, the intake door actuator 218, the air-mix door actuator 238, the mode door actuator 252 and the magnet clutch 229.

The set temperature information correcting circuit 400 comprises a fuzzy inference processing part 404 and a signal composing part 406. By analyzing a signal (viz., the signal representing a set temperature "TPTC") from the temperature setter switch 10 and a signal (viz., the signal representing an outside temperature "TAMB") from the outside temperature sensor 6, the fuzzy inference processing part 404 infers a set temperature correction amount "β" in accordance with a predetermined fuzzy control rule. By analyzing the set temperature correction amount "β" and the set temperature "TPTC" from the temperature setter switch 10, the signal composing part 406 calculates a recognition temperature "TRPTC" which is fed to the control part 255. In the signal composing part 406, an equation "TRPTC=TPTC+β" is carried out.

Figure 25:
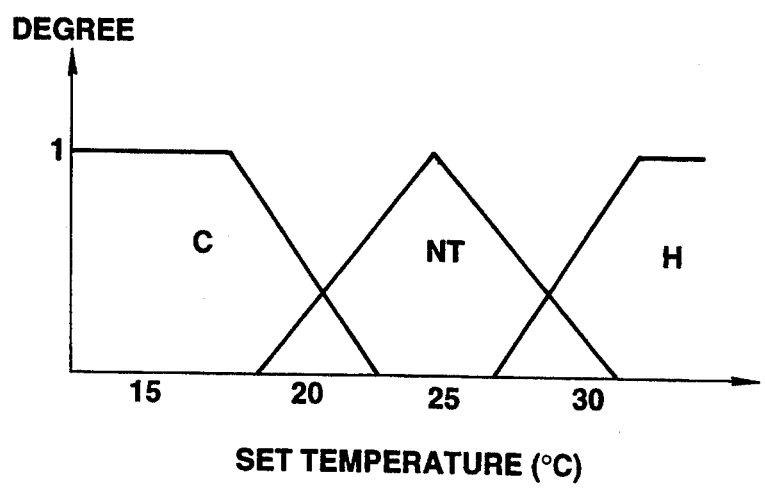
FIG. 25 is a graph of membership function, showing the classification in fuzzy label of set temperature, which is employed in the fourth embodiment.
Figure 26:
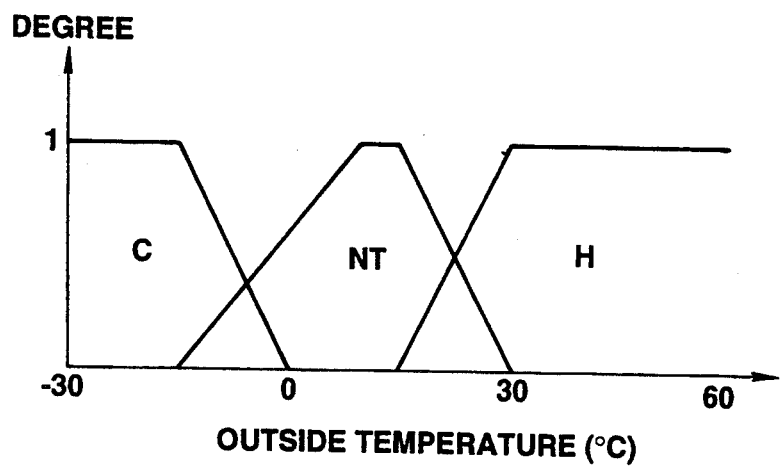
FIG. 26 is also a graph of membership function, showing the classification in fuzzy label of outside temperature, which is employed in the fourth embodiment.
Figures 27, 28:
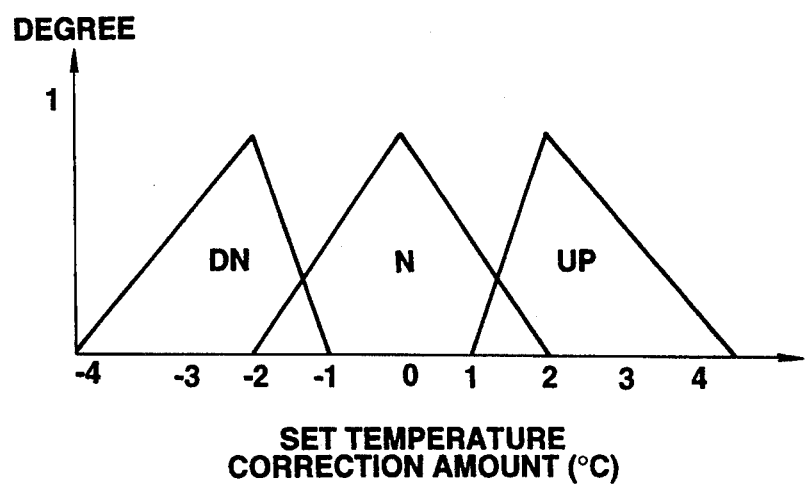
FIG. 27 is a graph of membership function, showing the classification in fuzzy label of set temperature correction amount, which is employed in the fourth embodiment.
FIG. 28 is a table showing a fuzzy rule employed in the fourth embodiment.

In a ROM of the fuzzy inference processing part 404, there are stored membership functions which are shown in FIGS. 25 to 27.

In the membership function graph of FIG. 25, the temperature "TPTC" set by the temperature setter switch 10 is represented by the axis of abscissa and the corresponding degree is represented by the axis of ordinate. The degree is represented by a fuzzy label. That is, when set temperature "TPTC" is lower than 23° C., a fuzzy label "low (C)" is provided, when the set temperature "TPTC" is within a range from 19° C. to 31° C., a fuzzy label "normal (NT)" is provided and when the set temperature "TPTC" is higher than 27° C., a fuzzy label "high (H)" is provided.

In the membership function graph of FIG. 26, the outside temperature "TAMB" detected by the outside temperature sensor 6 is represented by the axis of abscissa and the corresponding degree is represented by the axis of ordinate. When the outside temperature "TAMB" is lower than 0° C., a fuzzy label "cool (C)" is provided, when the outside temperature "TAMB" is within a range from −15° C. to +30° C., a fuzzy label "normal (NT)" is provided and when the outside temperature "TAMB" is higher than +15° C., a fuzzy label "hot (H)" is provided.

In the membership function graph of FIG. 27, the set temperature correction amount "β" is represented by the axis of abscissa and the corresponding degree is represented by the axis of ordinate. When the correction amount "β" is within a range from −4.5° C. to −1° C., a fuzzy label "minus correction (DN)" is provided, when the correction amount "β" is within a range from −2° C. to +2° C., a fuzzy label "no correction (NT)" is provided, and when the correction amount "β" is within a range from +1° C. to +4.5° C., a fuzzy label "plus correction (UP)" is provided.

Furthermore, in the fourth embodiment, such a fuzzy rule as shown in FIG. 28 is stored in the ROM of the fuzzy inference processing part 404.

Figure 29:
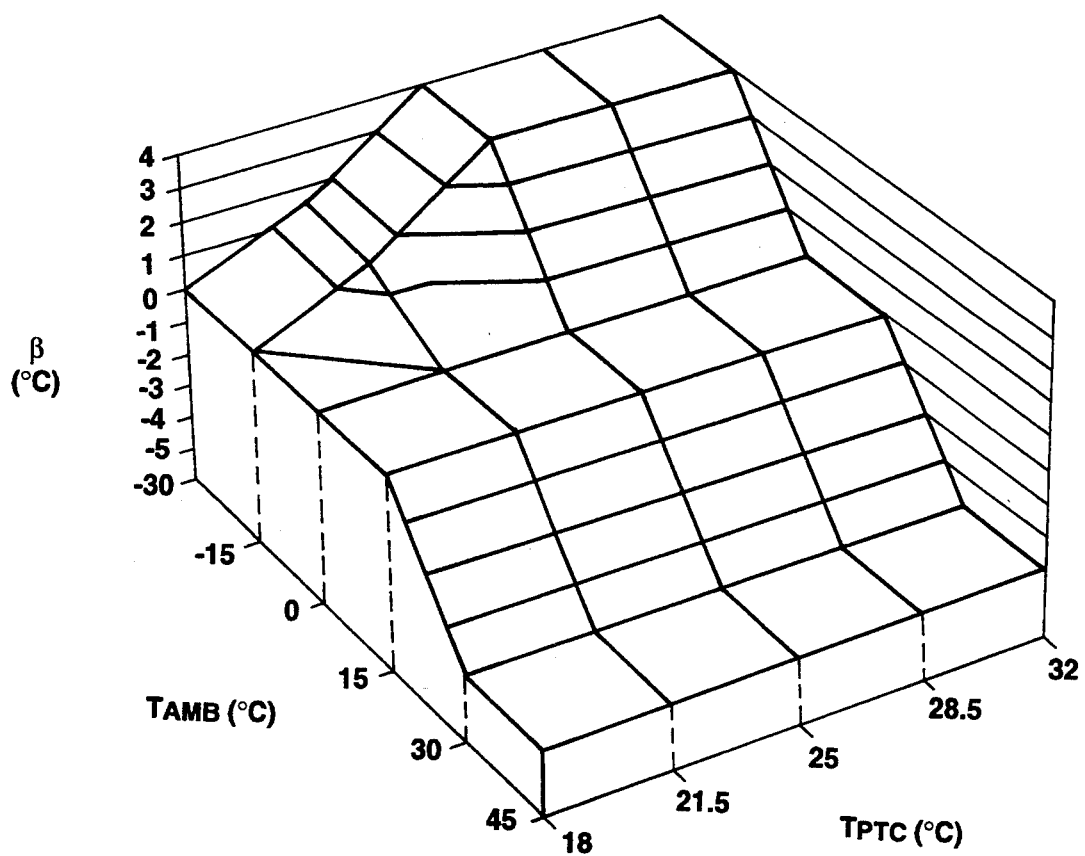
FIG. 29 is a three dimensional graph showing in a three-dimensional manner the relationship between the three parameters used in the fourth embodiment.

FIG. 29 is a three dimensional graph which shows in a three-dimensional manner the relationship between the set temperature "TPTC", the detected outside temperature "TAMB" and the correction amount "β". As will be seen from this graph, when the outside temperature "TAMB" is low, the changing rate of the correction amount "α" relative to the set temperature "TPTC" is relatively large, while, when the outside temperature "TAMB" is high, the changing rate is zero. This means that when, like in summer, the outside temperature is relatively high, the control for the air conditioning system is so made that the fluctuation of the passenger room temperature becomes small.

Figure 30:
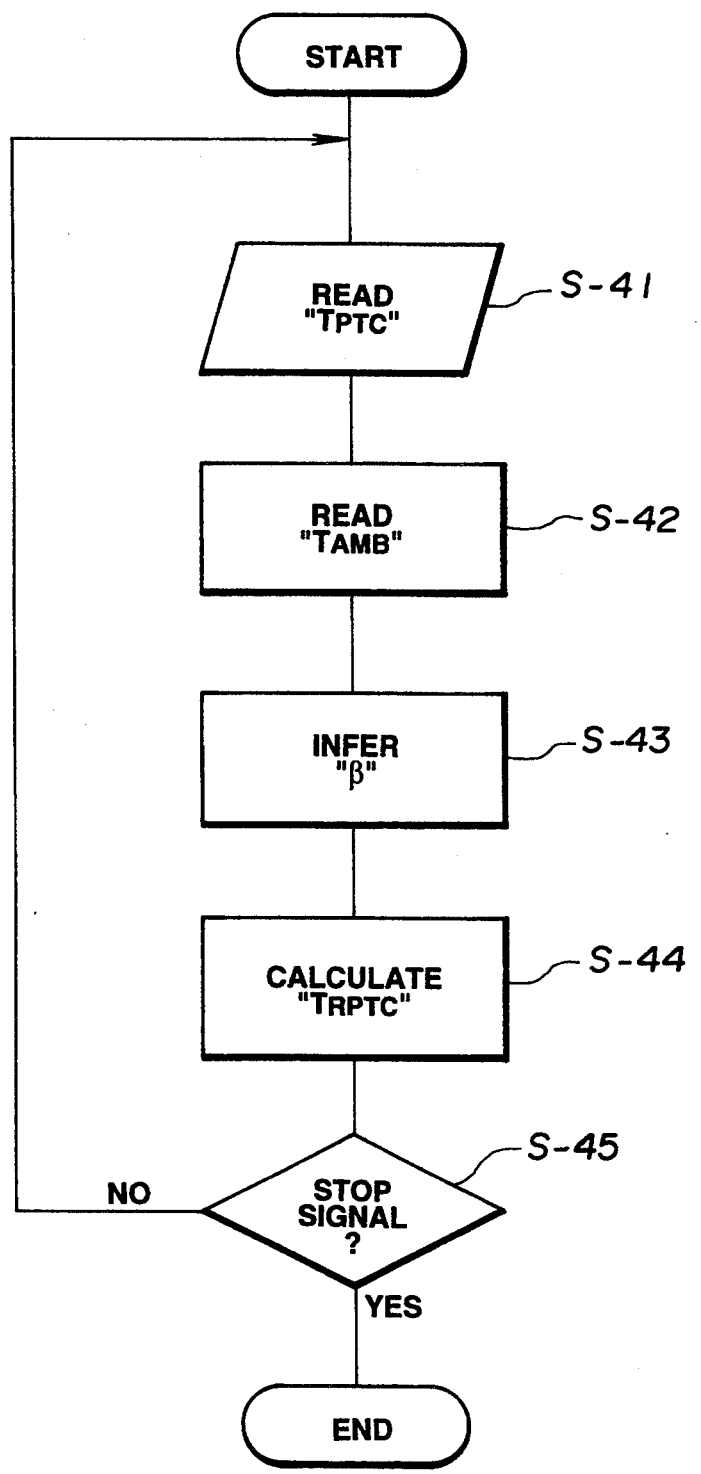
FIG. 30 is a flowchart showing programmed operation steps executed by a computer employed in the fourth embodiment.

In the following, operation of the air conditioning system of the fourth embodiment will be described with reference to the flowchart of FIG. 30.

At step S-41, the temperature "TPTC" set by the temperature setter switch 10 is read, and at step S-42, the outside temperature "TAMB" detected by the outside temperature sensor 6 is read. Then, at step S-43, the set temperature correction amount "$\beta$" is inferred from the values "TPTC" and "TAMB" by using the predetermined fuzzy control rule. At step S-44, a recognition temperature "TRPTC" is calculated by using the equation "TRPTC=TPTC+$\beta$". At step S-45, a judgment is carried out as to whether a stop signal for stopping the operation of the air conditioning system is issued or not. If No, the operation flow goes back to step S-41 to repeat the programmed operation. If Yes, the flow stops.

As will be understood from the above, in the fourth embodiment, by using membership functions for the parameters "TPCT", "TAMB" and "$\beta$" and a predetermined fuzzy rule, a set temperature correction amount "$\beta$" is derived and a recognition temperature "TRPTC" is derived based on the correction amount "$\beta$". Thus, in the fourth embodiment, it is possible to fit the control of the air conditioning system to the feeling or sensitivity of passengers. More specifically, in summer, the fluctuation of the room temperature is made relatively small, and in winter, the fluctuation is made relatively large.

Referring to FIGS. 31 to 43, there is shown a fifth embodiment of the present invention.

Since the fifth embodiment is also similar to the above-mentioned second embodiment, only portions and arrangements which are different from those of the second embodiment will be described in detail in the following.

Figure 31:
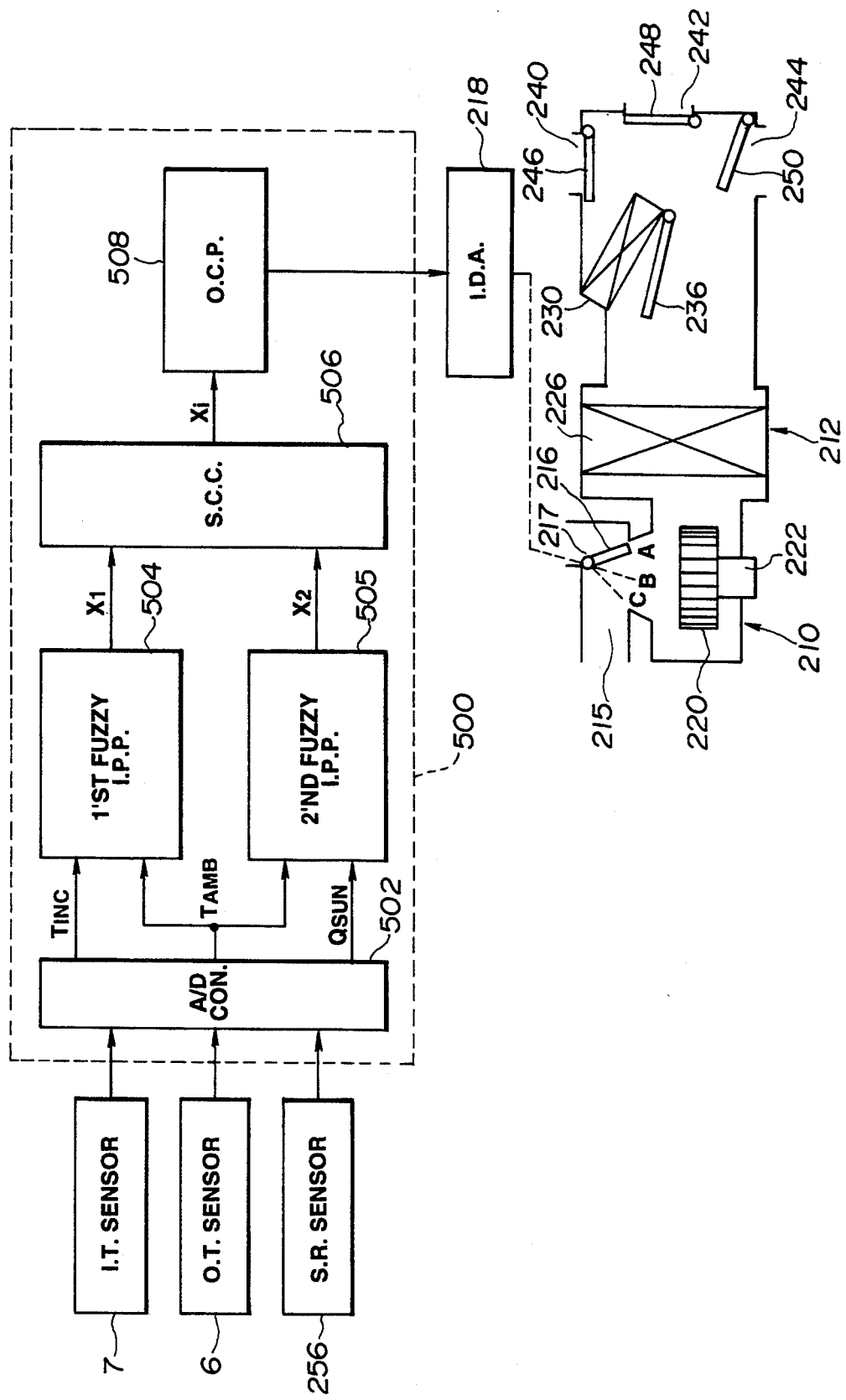
FIG. 31 is a schematic drawing showing a computer-controlled automotive air conditioning system, which is a fifth embodiment of the present invention.

FIG. 31 shows only the parts and arrangements which constitute an essential portion of the air conditioning system of the fifth embodiment. In the drawing, the outside and inside air ducts are denoted by, numerals 215 and 217 respectively. The outside air duct 215 leads to an opening exposed to the open air, and the inside air duct 217 leads to an opening exposed to the passenger room of the vehicle.

As is seen from the drawing, the intake door 216 is arranged to take three angular positions A, B and C. When the door 216 takes the position A or C, only outside or inside air is introduced into the air intake unit 210. While, when the door 216 takes the position B, both the outside and inside air is introduced into the air intake unit 210. Thus, by changing the angular position of the door 216, the mixing rate of the outside and inside air varies.

By processing information signals from the inside temperature sensor 7, the outside temperature sensor 6 and the solar radiation sensor 256, the control unit 500 controls the intake door actuator 218.

The control unit 500 comprises an A/D converter 502, a first fuzzy inference processing part 504, a second fuzzy inference processing part 505, a signal composing part 506 and an output circuit part 508. The A/D converter 502 converts analog signals to digital signals. By analyzing the signal representing the temperature "TINC" detected by the inside temperature sensor 7 and the signal representing the temperature "TAMB" detected by the outside temperature sensor 6, the first fuzzy inference processing part 504 infers a first intake index value "X1" in accordance with a first predetermined fuzzy control rule. By analyzing the signal representing the temperature "TAMB" detected by the outside temperature sensor 6 and the signal representing the solar radiation quantity "QSUN" detected by the solar radiation sensor 256, the second fuzzy inference processing part 505 infers a second intake index value "X2" in accordance with a second predetermined fuzzy control rule. By analyzing both the values "X1" and "X2", the signal composing part 506 calculates an intake index value "Xi". In accordance with the value "Xi", the output circuit part 508 outputs a drive signal to the intake door actuator 218.

Figure 32:
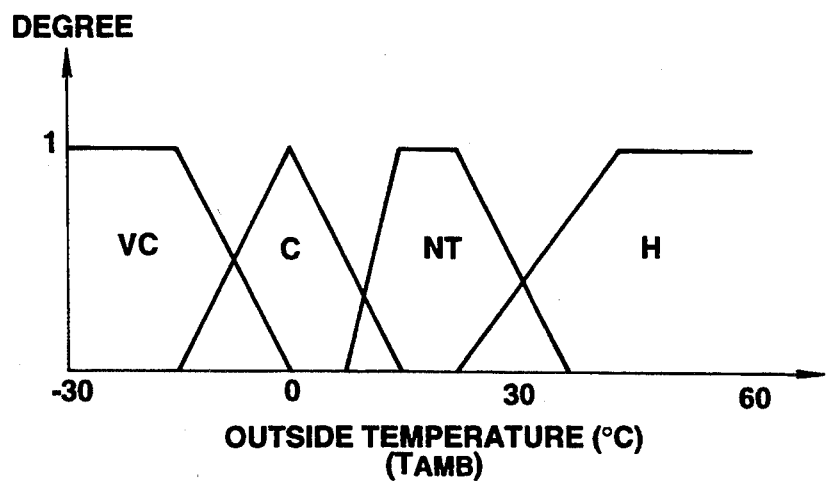
FIG. 32 is a graph of membership function, showing the classification in fuzzy label of outside temperature, which is employed in the fifth embodiment.
Figure 33:
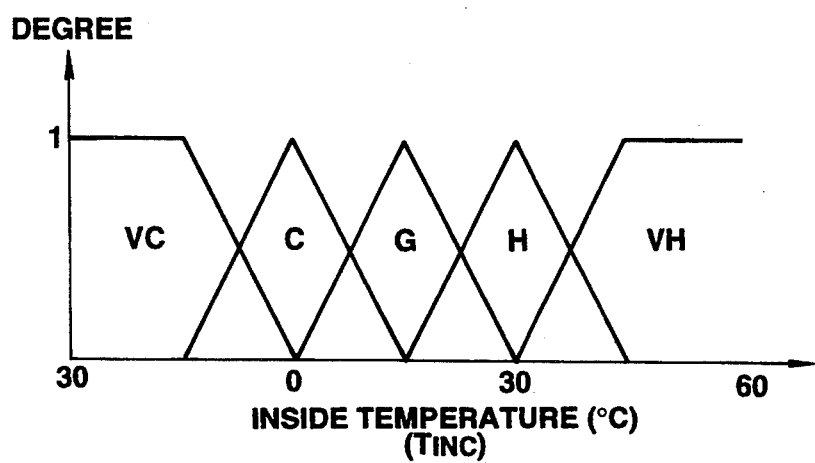
FIG. 33 is also a graph of membership function, showing the classification in fuzzy label of inside temperature, which is employed in the fifth embodiment.
Figures 34, 35:
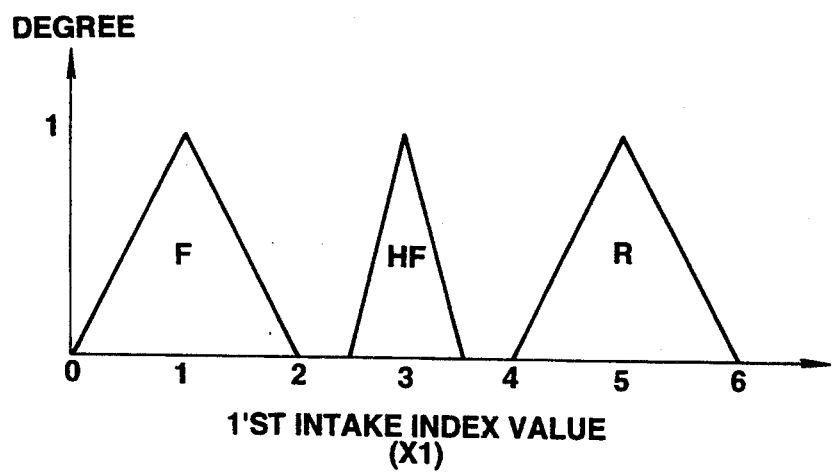
FIG. 34 is a graph of membership function, showing the classification in fuzzy label of a first intake index value, which is employed in the fifth embodiment.
FIG. 35 is a table showing a fuzzy rule employed in the fifth embodiment.

In a ROM of the first fuzzy inference processing part 504, there are stored membership functions which are shown in FIGS. 32 to 34.

In the membership function graph of FIG. 32, the temperature "TAMB" detected by the outside temperature sensor 6 is represented by the axis of abscissa and the corresponding degree is represented by the axis of ordinate. The degree is represented by a fuzzy label. That is, when the outside temperature "TAMB" is lower than 0° C., a fuzzy label "very cold (VC)" is provided, when the outside temperature "TAMB" is within a range from $-15°$ C. to 15° C., a fuzzy label "cold (C)" is provided, when the outside temperature "TAMB" is within a range from 7.5° C. to 37.5° C., a fuzzy label "normal (NT)" is provided and when the outside temperature "TAMB" is higher than 22.5° C., a fuzzy label "hot (H)" is provided.

In the membership function graph of FIG. 32 the temperature "TINC" detected by the inside temperature sensor 7 is represented by the axis of the axis of abscissa and the corresponding degree is represented by the axis of ordinate. When the inside temperature "TINC" is lower than 0° C., a fuzzy label "very cold (VC)" is provided, when the inside temperature "TINC" is within a range from $-15°$ C. to 15° C., a fuzzy label "cold (C)" is provided, when the inside temperature "TINC" is within a range from 0° to 30° C., a fuzzy label "good (G)" is provided, when the inside temperature "TINC" is within a range from 15° C. to 45° C., a fuzzy label "hot (H)" is provided and when the inside temperature "TINC" is higher than 30° C., a fuzzy label "very hot (VH)" is provided.

In the membership function graph of FIG. 34, the first intake index value "X1" is represented by the axis of abscissa and the corresponding degree is represented by the axis of ordinate. when the value "X1" is within a range from 0 to 2, a fuzzy label "outside air induction (F)" is provided, when the value "X1" is within a range from 2.5 to 3.5, a fuzzy label "half outside air (HF)" is provided, and when the value "X1" is within a range from 4 to 6, a fuzzy label "inside air circulation (R)" is provided.

In the ROM of the first fuzzy inference processing part 504, such a fuzzy rule as shown in FIG. 35 is further stored.

It is to be noted that above-mentioned membership functions and the fuzzy rule which are stored in the first fuzzy inference processing unit should be previously determined in accordance with various experiments. That is, from such experiments, the priority of window defrosting and that of cooling of the passenger room are obtained by changing the relationship between the outside temperature "TAMB" and the inside temperature "TINC". With reference to a load matching to the priority, desired intake mode is determined.

Figure 36:
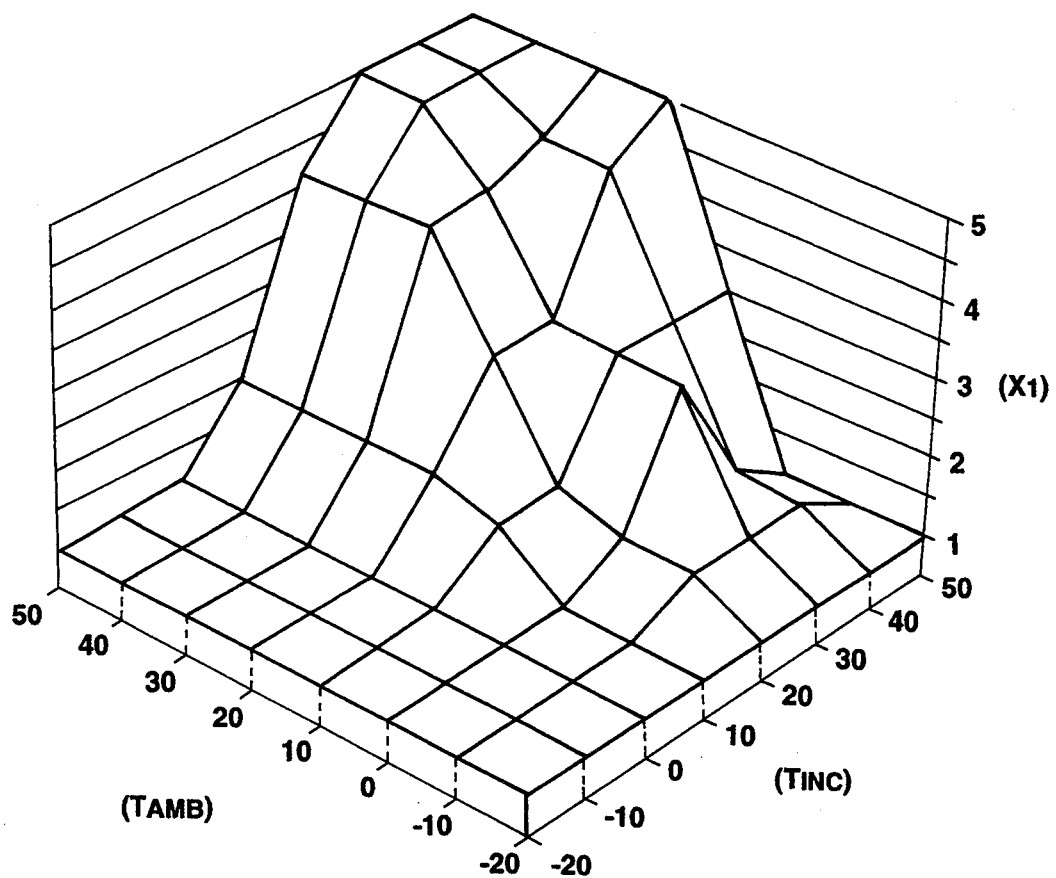
FIG. 36 is a three dimensional graph showing in a three-dimensional manner the relationship between the three parameters used in the fifth embodiment.

FIG. 36 is a three dimensional graph which shows in a three-dimensional manner the relationship between the outside temperature "TAMB", the inside temperature "TINC" and the first intake index value "X1".

Figure 37:
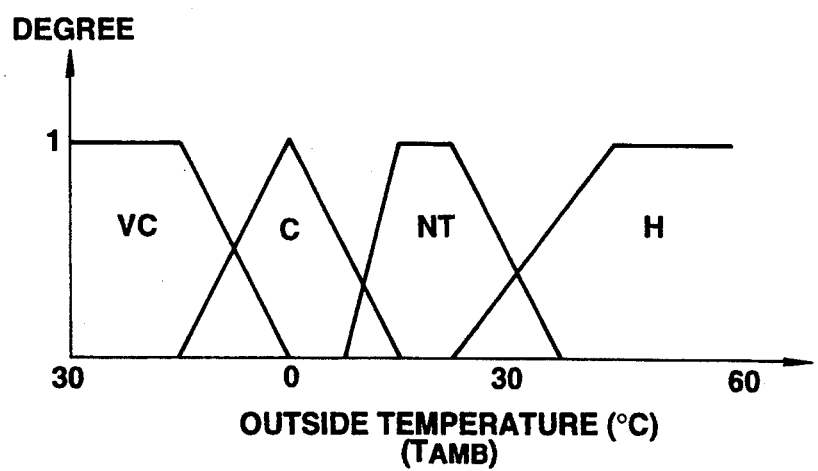
FIG. 37 is a graph of membership function, showing the classification in fuzzy label of outside temperature, which is also employed in the fifth embodiment.
Figure 38:
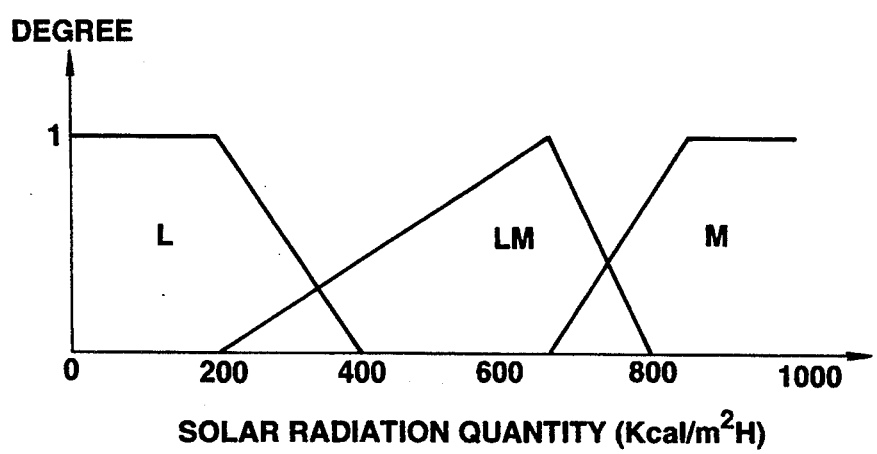
FIG. 38 is also a graph of membership function, showing the classification in fuzzy label of solar radiation quantity, which is also employed in the fifth embodiment.
Figures 39, 40:
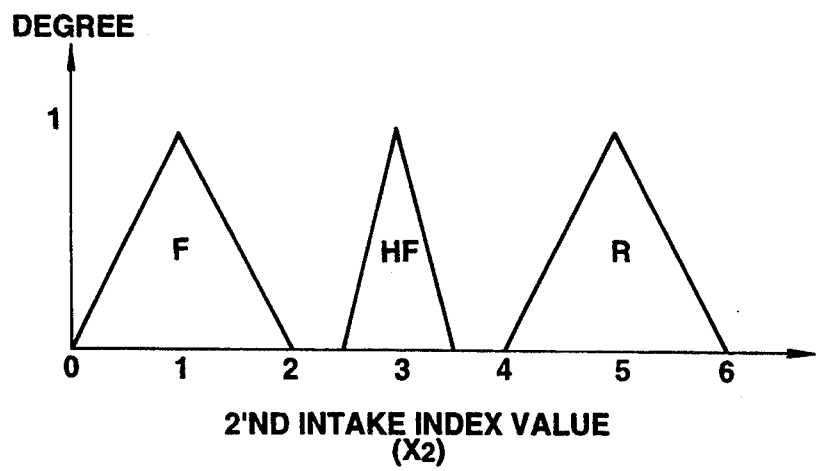
FIG. 39 is a graph of membership function, showing the classification in fuzzy label of a second intake index value, which is also employed in the fifth embodiment.
FIG. 40 is a table showing a fuzzy rule employed also in the first embodiment.

In a ROM of the second fuzzy inference processing part 505, there are stored membership functions which are shown in FIGS. 37 to 39.

In the membership function graph of FIG. 37, the temperature "TAMB" detected by the outside temperature sensor 6 is represented by the axis of abscissa and the corresponding degree is represented by the axis of ordinate. As is easily understood, the membership function graph of FIG. 37 is the same as that of FIG. 32 of the first fuzzy inference processing part 504. Thus, explanation of the graph will be omitted.

In the membership function graph of FIG. 38, the solar radiation quantity "QSUN" detected by the solar radiation sensor 256 is represented by the axis of the axis of abscissa and the corresponding degree is represented by the axis of ordinate. When the solar radiation quantity "QSUN" is smaller than 400 Kcal/m$^2$H, a fuzzy label "small (L)" is provided, when the solar radiation amount "QSUN" is within a range from 200 Kcal/m$^2$H to 88 Kcal/m$^2$H, a fuzzy label "somewhat large (LM)" is provided and when the solar radiation amount "QSUN" is greater than 660 Kcal/m$^2$H, a fuzzy label "large (M)" is provided.

In the membership function graph of FIG. 39, the second intake index value "X2" is represented by the axis of abscissa and the corresponding degree is represented by the axis of ordinate. when the value "X2" is within a range from 0 to 2, a fuzzy label "outside air induction (F)" is provided, when the value "X2" is within a range from 2.5 to 3.5, a fuzzy label "half outside air (HF)" is provided, and when the value "X2" is within a range from 4 to 6, a fuzzy label "inside air circulation (R)" is provided. As is easily understood, the membership function graph of FIG. 39 is the same as that of FIG. 34 of the first fuzzy inference processing part 504.

In the ROM of the second fuzzy inference processing part 505, such a fuzzy rule as shown in FIG. 40 is also stored.

It is to be noted that above-mentioned membership functions and the fuzzy rule which are stored in the second fuzzy inference processing part should be previously determined in accordance with various experiments. That is, from such experiments, the priority of window defrosting and that of cooling of the passenger room are obtained by changing the relationship between the outside temperature "TAMB" and the solar radiation quantity "QSUN". With reference to a thermal load matching to the priority, desired intake mode is determined.

Figure 41:
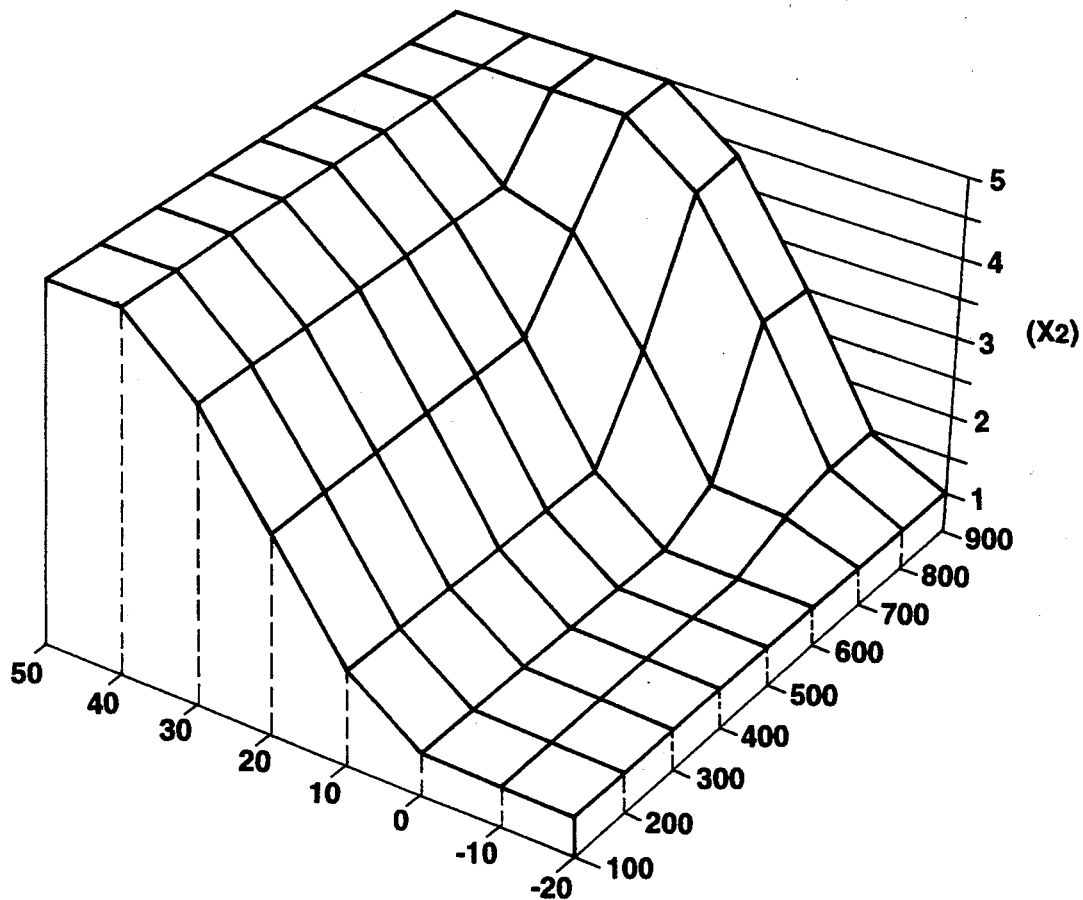
FIG. 41 is a three dimensional graph showing in a three-dimensional manner the relationship between the other three parameters also used in the fifth embodiment.

FIG. 41 is a three dimensional graph which shows in a three-dimensional manner the relationship between the outside temperature "TAMB", the solar radiation quantity "QSUN" and the second intake index value "X2".

Figure 42:
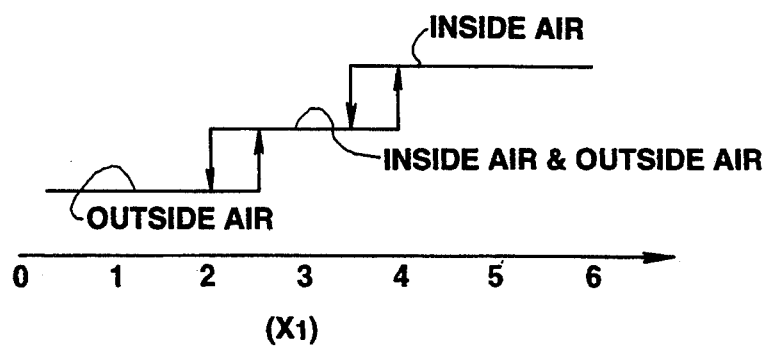
FIG. 42 is a graph showing an intake control characteristic obtained in the fifth embodiment.

The first and second intake index values "X1" and "X2" produced by the first and second fuzzy inference processing parts 504 and 505 are fed to the signal composing part 506 which, by analyzing the values "X1" and "X2", issues the intake index value "Xi". The signal composing part 506 comprises an AND circuit and thus selects one of the values "X1" and "X2", which is smaller. This means that the control of the air conditioning system has such a characteristic mode that the intake door 216 tends to open the outside air duct 215 (see FIG. 31) as larger as possible. By receiving the intake index value "Xi", the output circuit part 508 issues a drive signal to the intake door actuator 218. Actually, the intake index value "Xi" controls the intake mode as shown in FIG. 42.

Figure 43:
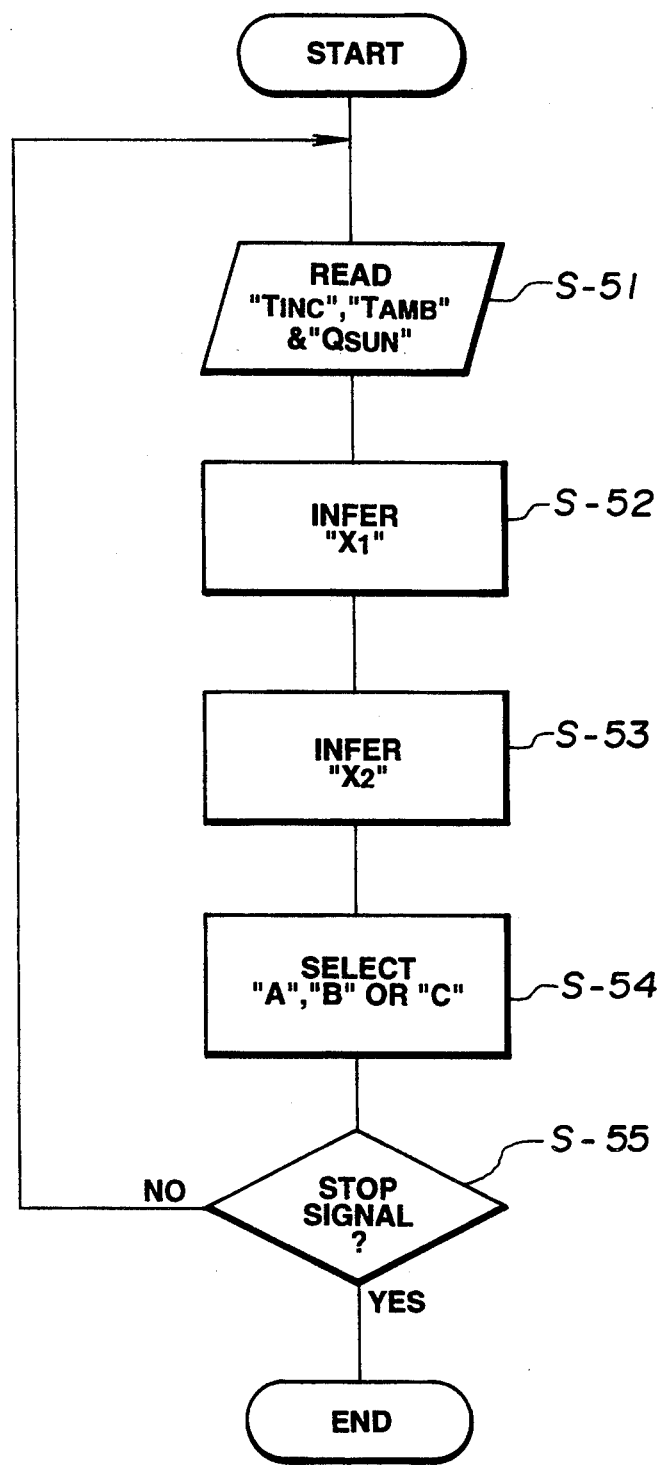
FIG. 43 is a flowchart showing programmed operation steps executed by a computer employed in the fifth embodiment.

The programmed operation of the air conditioning system of the fifth embodiment will understood from the flowchart of FIG. 43.

In this fifth embodiment, the angular position of the intake door 216 can be easily imaged due to usage of the two fuzzy inference processing parts 504 and 505 in the control unit 500. Thus, tuning of the intake door 216 is easily achieved.

Referring to FIGS. 44 to 50, there is shown a sixth embodiment of the present invention.

Figure 44:
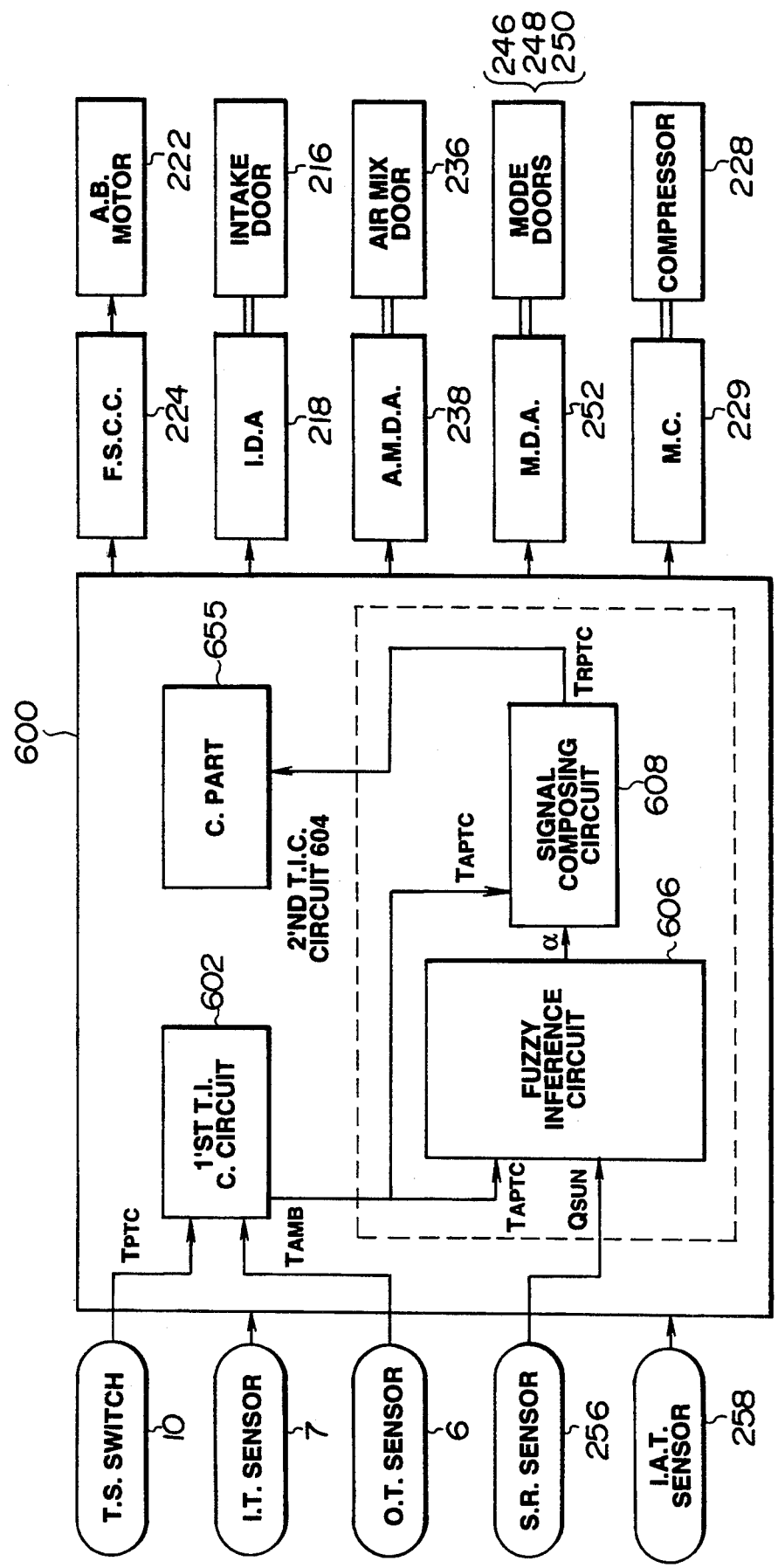
FIG. 44 is a block diagram showing a computer-controlled automotive air conditioning system, which is a sixth embodiment of the present invention.

As is seen from FIG. 44, the air conditioning system of the sixth embodiment comprises substantially the same parts as those of the fourth embodiment of FIG. 24 except the control unit.

In the sixth embodiment, the control unit 600 has a control part 655 which, by processing information signals from the switch 10 and the sensors 7, 6, 256 and 258, controls the fan speed control circuit 224, the intake door actuator 218, the air-mix door actuator 238, the mode door actuator 252 and the magnet clutch 229.

The control unit 600 comprises a first temperature information correction circuit 602 and a second temperature information correction circuit 604.

The first temperature information correction circuit 602 corrects the temperature "TPTC" set by the temperature setter switch 10 with reference to the outside temperature "TAMB" detected by the outside temperature sensor 6. Thus, the first circuit 602 issues a signal representing a set temperature correction amount "TAPTC".

The second temperature information correction circuit 604 corrects the set temperature correction amount signal "TAPTC" with reference to both the solar radiation quantity "QSUN" detected by the solar radiation sensor 256 and the set temperature correction amount signal "TAPTC".

The second temperature information correction circuit 604 comprises a fuzzy inference processing part 606 and a signal composing part 608. By analyzing the corrected value "TAPTC" from the first correction circuit 602 and the solar radiation quantity "QSUN" from the solar radiation sensor 256, the fuzzy inference processing part 606 infers a correction factor "α" for the set temperature correction amount signal "TAPTC" in accordance with a predetermined fuzzy control rule. By treating the correction factor "α" and the set temperature correction amount signal "TAPTC", the signal composing part 608 outputs a signal representing a recognition set temperature "TRPTC" which is fed to the control part 655. In the signal composing part 608, an equation "TRPTC=TAPTC+α" is carried out.

Figure 45:
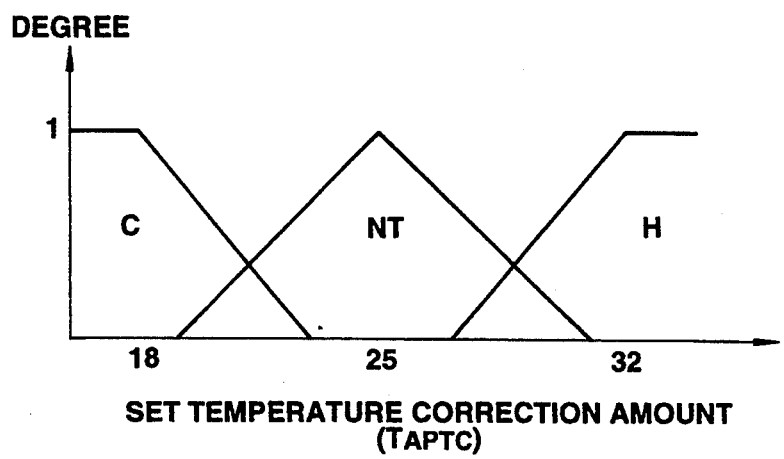
FIG. 45 is a graph of membership function, showing the classification in fuzzy label of set temperature correction amount signal, which is employed in the sixth embodiment.
Figure 46:
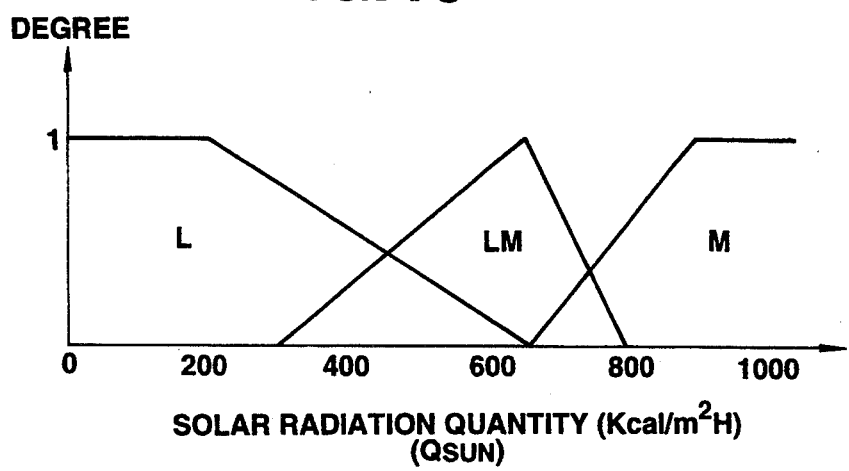
FIG. 46 is also a graph of membership function, showing the classification in fuzzy label of solar radiation quantity, which is employed in the sixth embodiment.
Figure 47:
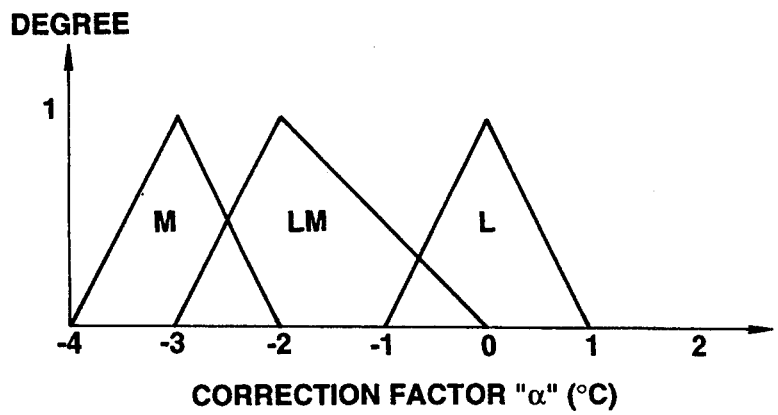
FIG. 47 is a graph of membership function, showing the classification in fuzzy label of correction factor, which is employed in the sixth embodiment.

In a ROM of the fuzzy inference processing part 606, there are stored membership functions which are shown in FIGS. 45 to 47.

In the membership function graph of FIG. 45, the set temperature correction amount "TAPTC" is represented by the axis of abscissa and the corresponding degree is represented by the axis ordinate. The degree is represented by a fuzzy label. That is, when the set temperature correction amount "TAPTC" is lower than 23° C., a fuzzy label "low (C)" is provided, when the correction amount "TAPTC" is within a range from 19° C. to 31° C., a fuzzy label "normal (NT)" is provided, and when the correction amount "TAPTC" is greater than 27° C., a fuzzy label "high (H)" is provided.

In the membership function graph of FIG. 46, the solar radiation quantity "QSUN" is represented by the axis of abscissa and the corresponding degree is represented by the axis of ordinate. When the solar radiation quantity "QSUN" is lower than 660 Kcal/m²H, a fuzzy label "small (L)" is provided, when the solar radiation quantity "QSUN" is within a range from 300 Kcal/m²H to 800 Kcal/m²H, a fuzzy label "little much (LM)" is provided, and when the solar radiation quantity "QSUN" is larger than 660 Kcal/m²H, a fuzzy label "much (M)" is provided.

In the membership function shown in FIG. 47, the correction factor "$\alpha$" of the set temperature correction amount signal "TAPTC" is represented by the axis of abscissa and the corresponding degree is represented by the axis of ordinate. When the correction factor "$\alpha$" is within a range from −4° C. to −2° C., a fuzzy label "large correction (M)" is provided, when the correction factor "$\alpha$" is within a range from −3° C. to 0° C., a fuzzy label "correction (LM)" is provided, and when the correction factor "$\alpha$" is within a range from −1° C. to +1° C., a fuzzy label "slight correction (L)" is provided.

Figures 48, 49:
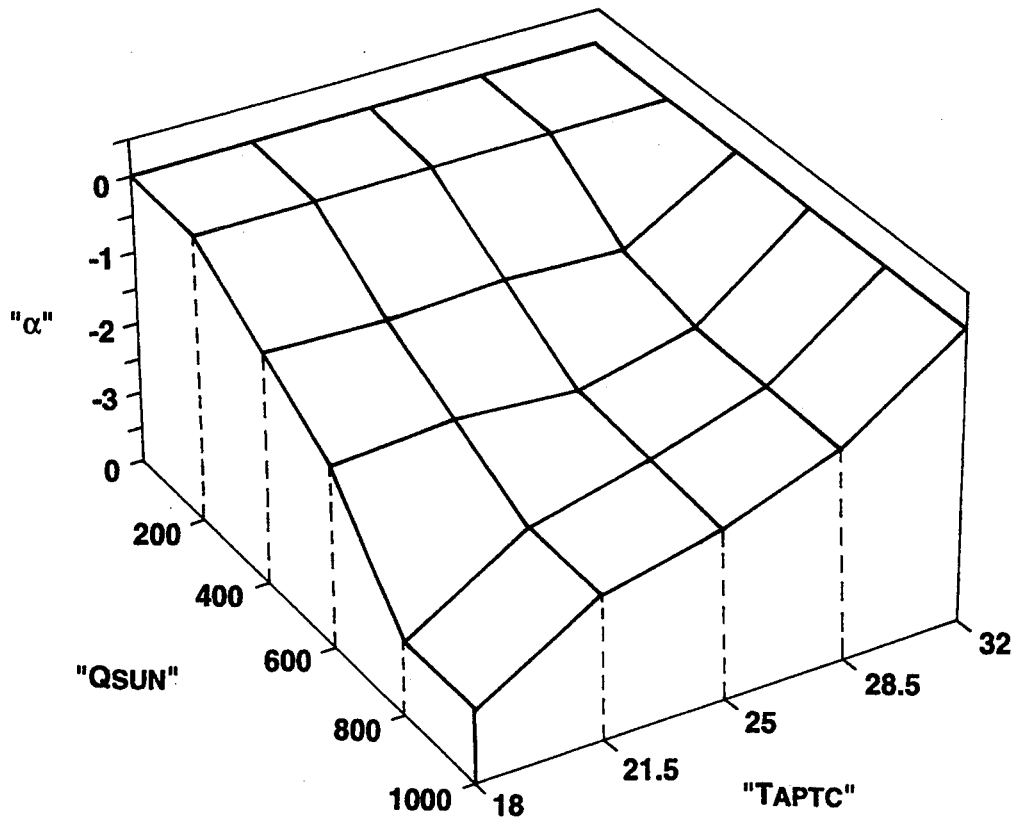
FIG. 48 is a table showing a fuzzy rule employed in the sixth embodiment.
FIG. 49 is a three dimensional graph showing in a three-dimensional manner the relationship between the three parameters used in the sixth embodiment.

Furthermore, in this sixth embodiment, such a fuzzy rule as shown in FIG. 48 is stored in the ROM of the fuzzy inference processing part 606.

In the sixth embodiment, the fuzzy control rule is so made that the correction factor "$\alpha$" increases with decrease in the set temperature (more specifically, the set temperature correction amount "TAPTC" of set temperature) and with increase in the solar radiation quantity "QSUN". This is because a passenger who likes somewhat cooler atmosphere tends to set the room temperature at a relatively low level and a passenger who likes somewhat warmer atmosphere tends to set the room temperature at a relatively high level.

FIG. 49 is a three dimensional graph which shows in a three-dimensional manner the relationship between the set temperature correction amount "TAPTC", the solar radiation quantity "QSUN" and the correction factor "$\alpha$".

Figure 50:
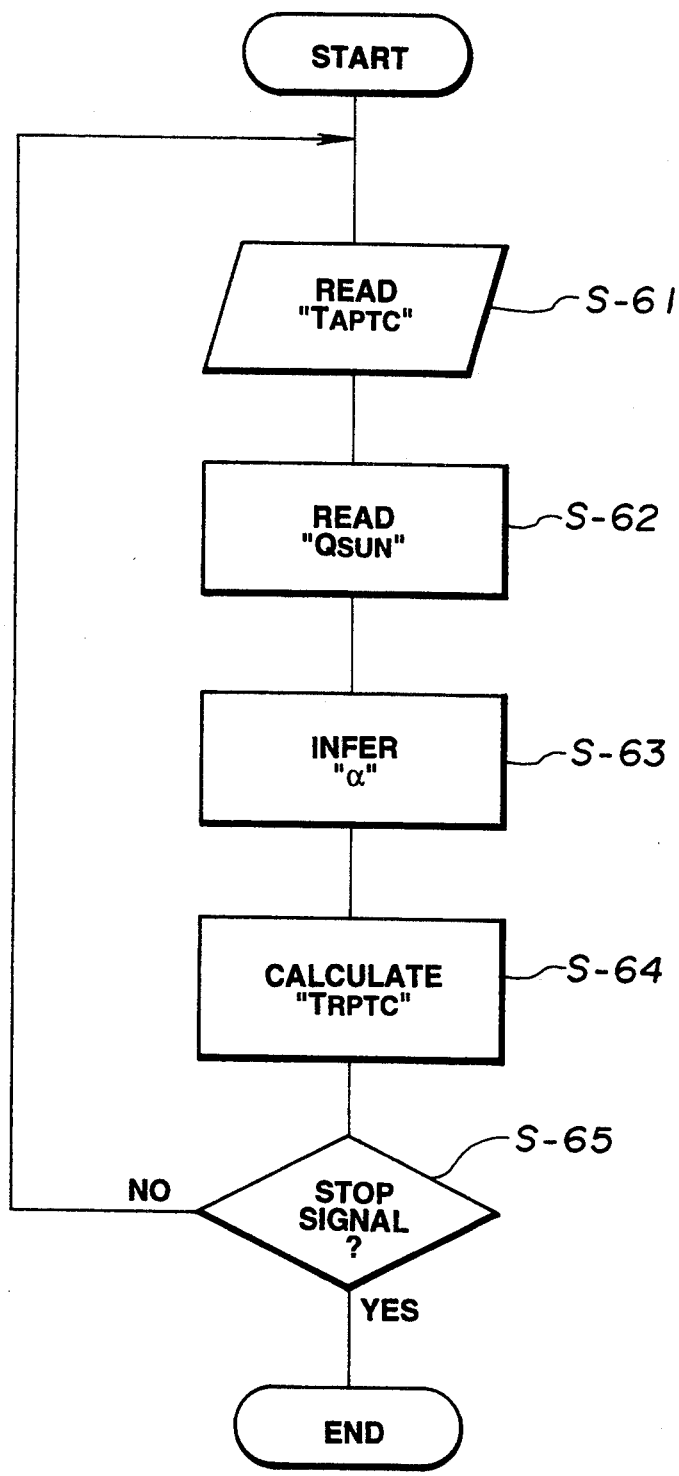
FIG. 50 is a flowchart showing programmed operation steps executed by a computer employed in the sixth embodiment.
Figure 51:
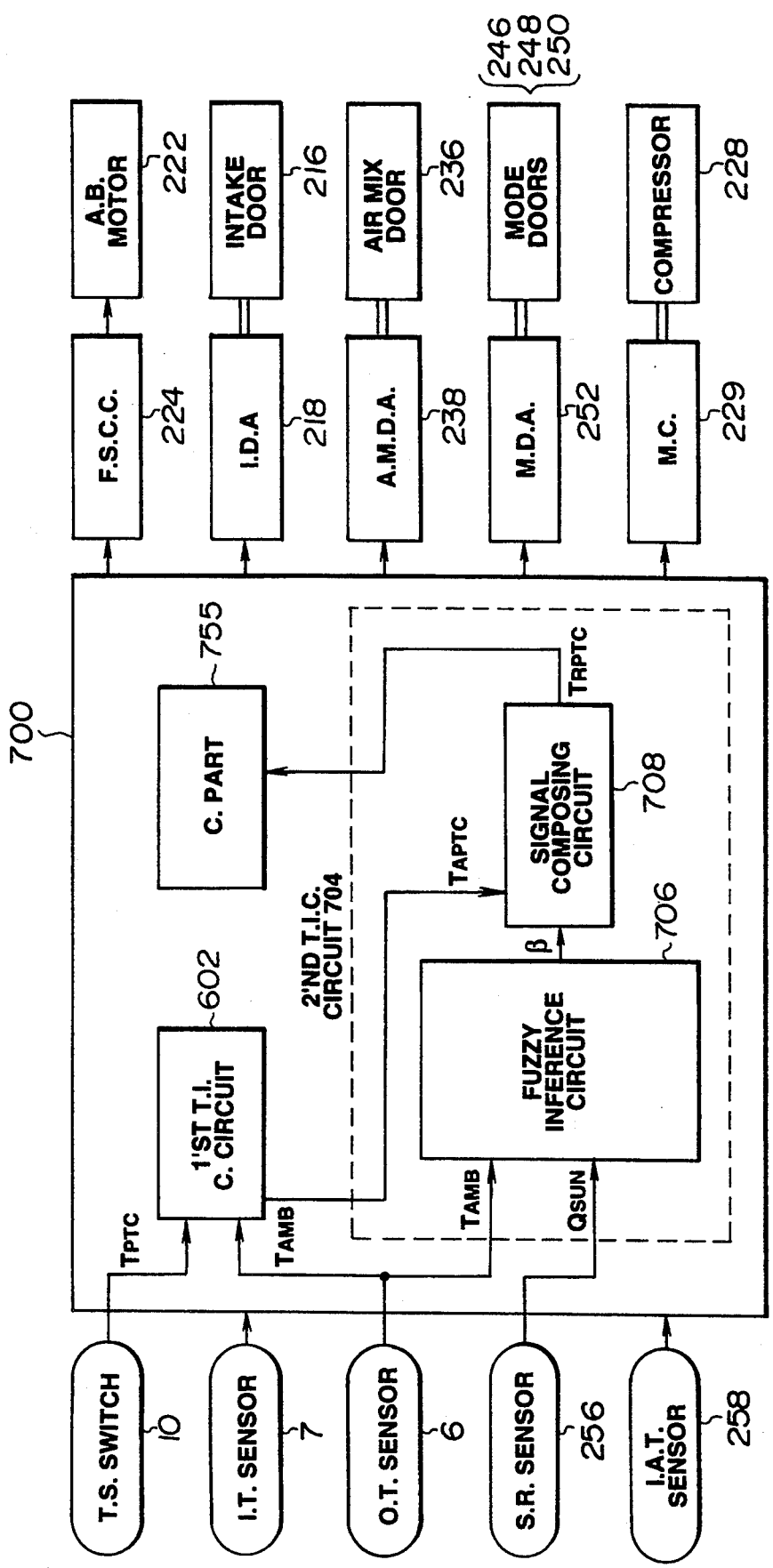
FIG. 51 is a block diagram showing a computer-controlled automotive air conditioning system, which is a seventh embodiment of the present invention.

The programmed operation of the air conditioning system of the sixth embodiment will be understood from the flowchart of FIG. 50.

As is seen from the above, in the sixth embodiment, by applying a fuzzy inference theory to the set temperature correction amount "TAPTC" and the solar radiation quantity "QSUN", the correction factor "$\alpha$" is derived which can be an index to the matching of the temperature actually provided in the passenger room and the temperature comfortably felt by the passengers. Thus, in the sixth embodiment, the control of the air conditioning system is carried out in a manner to match the feeling of the passengers.

Referring to FIGS. 51 to 55, there is shown a seventh embodiment of the present invention.

Since the seventh embodiment is similar to the above-mentioned sixth embodiment, only parts and arrangements which are different from those of the sixth embodiment will be described in the following. The same parts are denoted by the same numerals.

As is seen from 51, the control unit 700 of this seventh embodiment a first temperature information correction circuit 602 and a second temperature information correction circuit 704. The first temperature information correction circuit 602 corrects the temperature "TPTC" set by the temperature setter switch 10 with reference to the outside temperature "TAMB" detected by the outside temperature sensor 6. Thus, the first circuit 602 issues a signal representing a set temperature correction amount "TAPTC".

The second temperature information correction circuit 704 corrects the set temperature correction amount signal "TAPTC" with reference to both the outside temperature "TAMB" detected by the outside temperature sensor 6 and the solar radiation quantity "QSUN" detected by the solar radiation sensor 256.

The second temperature information correction circuit 704 comprises a fuzzy inference processing part 706 and a signal composing part 708. By analyzing both the outside temperature "TAMB" from the outside temperature sensor 6 and the solar radiation quantity "QSUN" from the solar radiation sensor 256, the fuzzy inference processing part 706 infers a correction factor "$\beta$" for the set temperature correction amount signal "TAPTC" in accordance with a predetermined fuzzy control rule. By treating the correction factor "$\beta$" and the correction amount signal "TAPTC", the signal composing part 708 outputs a signal representing a recognition set temperature "TRPTC" which is fed to the control part 755. In the signal composing part 708, an equation "TRPTC=TAPTC+$\beta$" is carried out.

Figure 52:
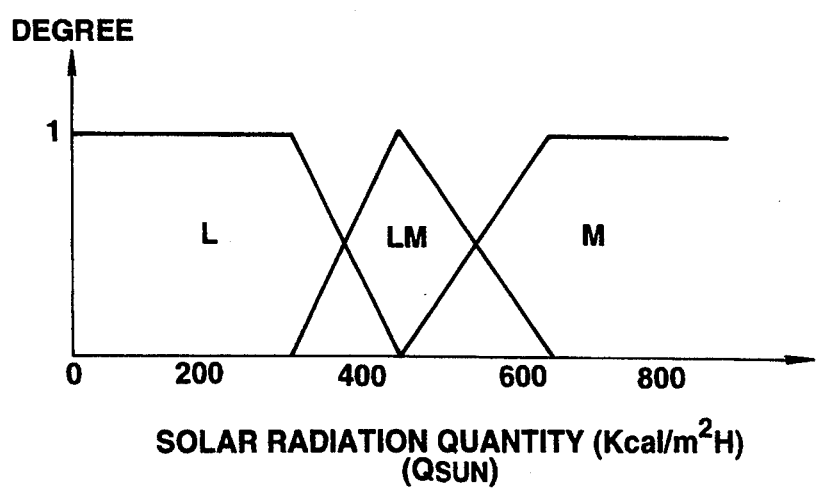
FIG. 52 is a graph of membership function, showing the classification in fuzzy label of solar radiation quantity, which is employed in the seventh embodiment.
Figure 53:
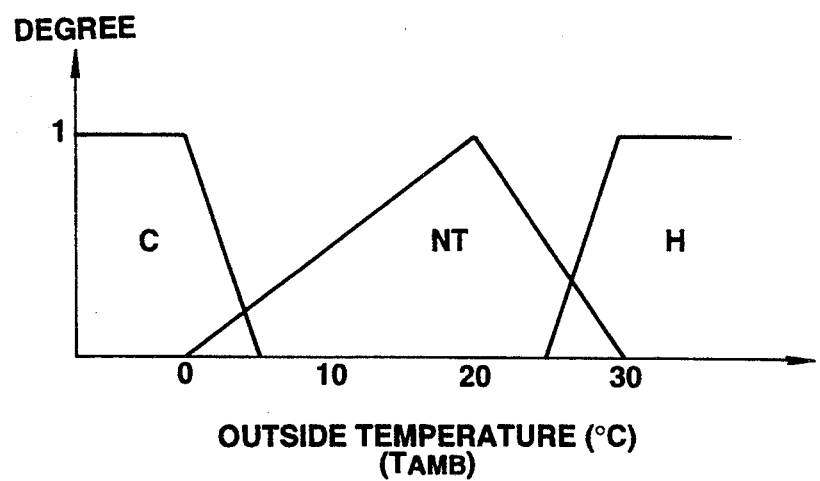
FIG. 53 is also a graph of membership function, showing the classification in fuzzy label of outside temperature, which is employed in the seventh embodiment.
Figures 54, 55:
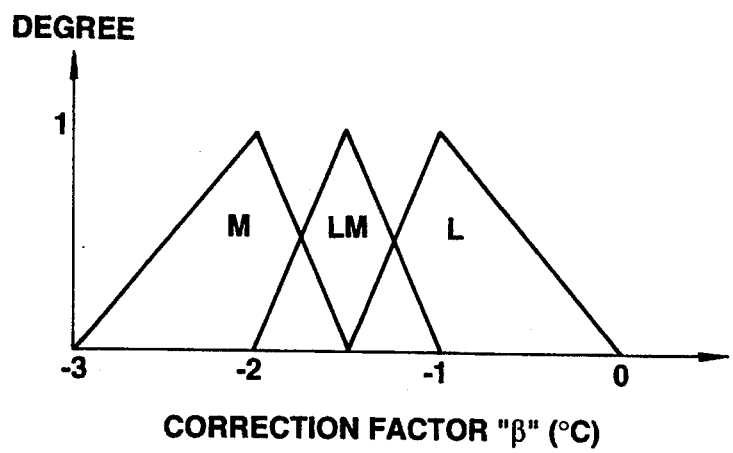
FIG. 54 is a graph of membership function, showing the classification in fuzzy label of correction factor, which is employed in the seventh embodiment.
FIG. 55 is a table showing a fuzzy rule employed in the seventh embodiment.

In a ROM of the fuzzy inference processing part 706, there are stored membership functions which are shown in FIGS. 52 to 54.

In the membership function graph of FIG. 52, the solar radiation quantity "QSUN" is represented by the axis of abscissa and the corresponding degree is represented by the axis of ordinate. The degree is represented by a fuzzy label. That is, when the solar radiation quantity "QSUN" is smaller than 450 Kcal/m²H, a fuzzy label "small (L)" is provided, when the solar radiation quantity "QSUN" is within a range from 300 to 660 Kcal/m²H, a fuzzy label "little much (LM)" is provided and when the solar radiation quantity "QSUN" is larger than 450 Kcal/m²H, a fuzzy label "much (M)" is provided.

In the membership function graph of FIG. 53, the outside temperature "TAMB" is represented by the axis of abscissa and the corresponding degree is represented by the axis of ordinate. When the outside temperature "TAMB" is lower than 5° C., a fuzzy label "cold (C)" is provided, when the outside temperature "TAMB" is within a range from 0° to +30° C., a fuzzy label "normal (NT)" is provided and when the outside temperature "TAMB" is higher than +25° C., a fuzzy label "hot (H)" is provided.

In the membership function graph of FIG. 54, the correction factor "$\beta$" is represented by the axis of abscissa and the corresponding degree is represented by the axis of ordinate. When the correction factor "$\beta$" is within a range from −3° C. to −1.5° C., a fuzzy label "large correction (M)" is provided, when the correction factor "$\beta$" is within a range from −2° to −1° C., a fuzzy label "correction (LM)" is provided and when the correction factor "$\beta$" is within a range from −1.5° C. to 0° C., a fuzzy label "slight correction (L)" is provided.

In this seventh embodiment, such a fuzzy rule as shown in FIG. 55 is stored in the ROM of the fuzzy inference processing part 706.

In the seventh embodiment, the fuzzy control rule is so made that the correction factor "β" increases with decrease in the outside temperature "TAMB". This is because a passenger tends to have a rush of blood to the head by warmed air when the outside temperature is low. That is, when the outside temperature is low, it is preferable to lower the recognition value of set temperature.

As is seen from the above, in the seventh embodiment, by applying a fuzzy inference theory to the solar radiation quantity "QSUN" and the outside temperature "TAMB", the correction factor "β" is derived which can be an index to the matching of the temperature actually provided in the passenger room and the temperature comfortably felt by the passengers. Thus, also in the seventh embodiment, the control of the air conditioning system is carried out in a manner to match the feeling of the passengers.

If desired, a modification may be provided by combining the concepts of the above-mentioned sixth and seventh embodiments. That is, by using an equation "γ=(α+β)/2", a correction factor "γ" for correcting the corrected value "TAPTC" may be provided.

Referring to FIGS. 56 to 62, there is shown an eighth embodiment of the present invention.

Figure 56:
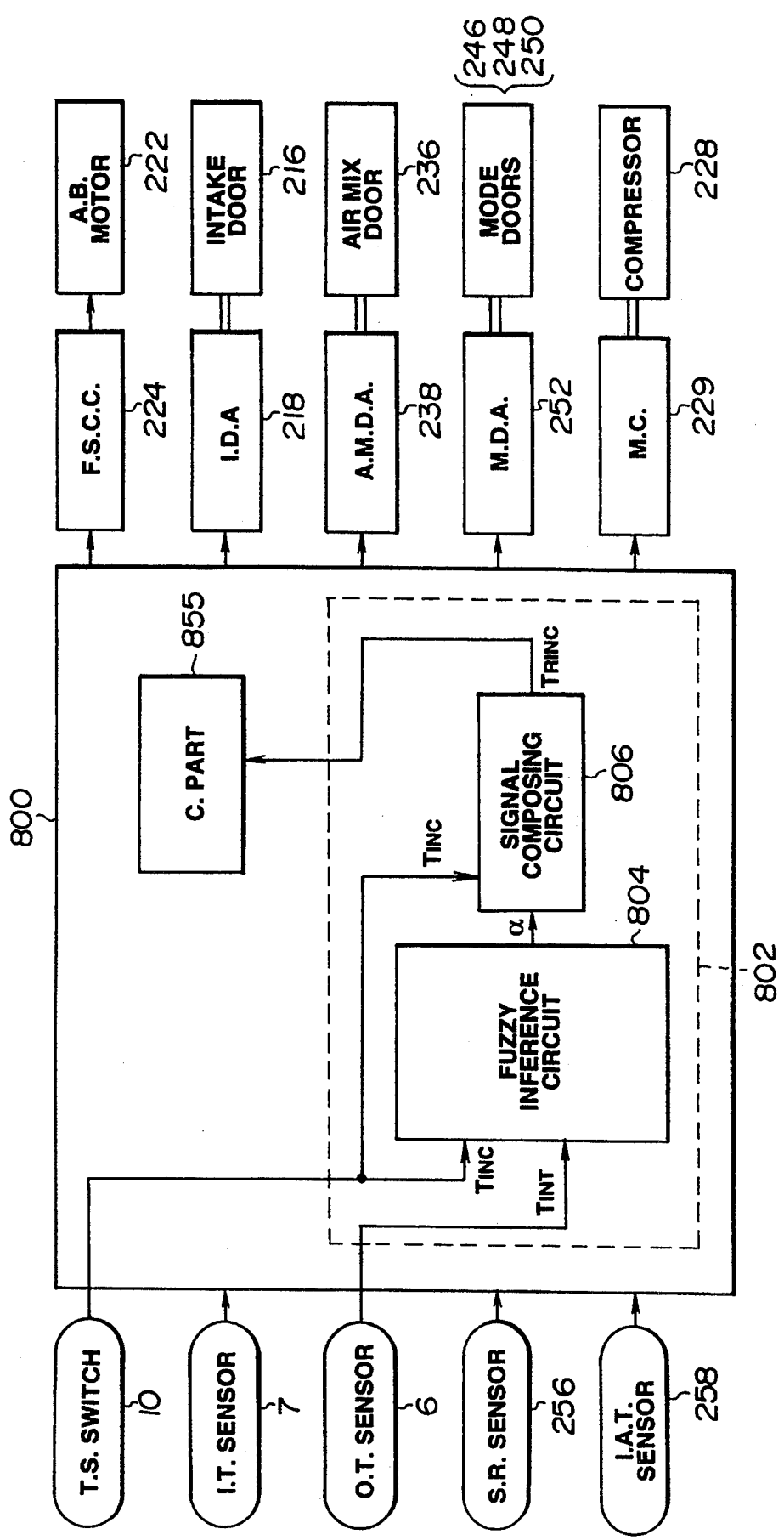
FIG. 56 is a block diagram showing a computer-controlled automotive air conditioning system, which is a eighth embodiment of the present invention.

As is seen from FIG. 56, the air conditioning system of this eighth embodiment comprises substantially the same parts as those of the fourth embodiment of FIG. 4 except the control unit.

In the eighth embodiment, the control unit 800 comprises an inside temperature information correction circuit 802 which functions to correct the temperature detected by the inside temperature sensor 7.

The inside temperature information correction circuit 802 comprises a fuzzy inference processing part 804 and a signal composing part 806. By analyzing the inside temperature "TINC" detected by the inside temperature sensor 7 and the intake air temperature "TINT" detected by the intake air temperature sensor 258, the fuzzy inference processing part 804 infers a correction factor "α" for the inside temperature "TINC" in accordance with a predetermined fuzzy control rule. By treating the correction factor "α" and the inside temperature "TINC", the signal composing part 806 outputs a signal representing a recognition temperature "TRINC" which is fed to the control part 855. In the signal composition part 806, an equation "TRINC=TINC+α" is executed.

Figure 57:
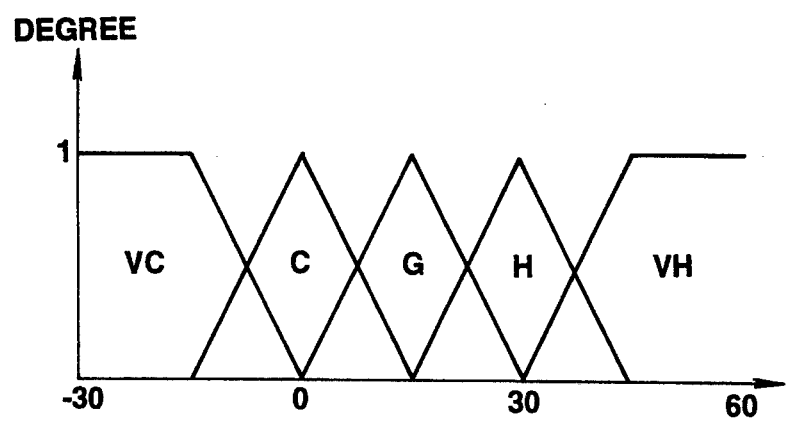
FIG. 57 is a graph of membership function, showing the classification in fuzzy label of inside temperature, which is employed in the eighth embodiment.
Figure 58:
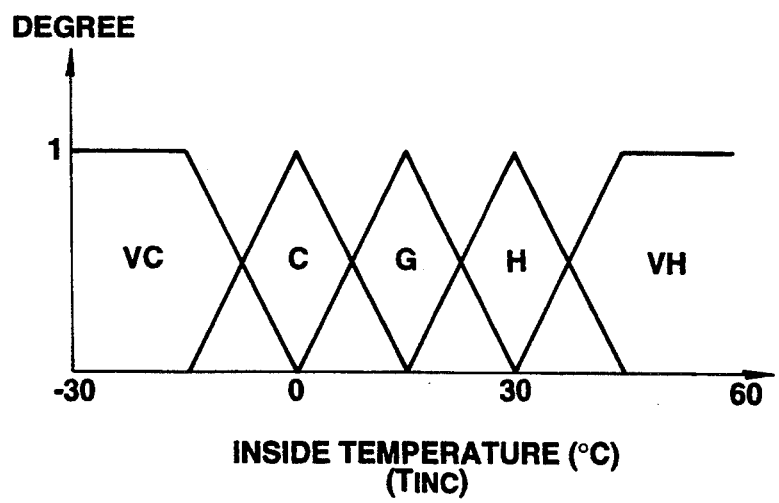
FIG. 58 is also a graph of membership function, showing the classification in fuzzy label of intake air temperature, which is employed in the eighth embodiment.
Figures 59, 60:
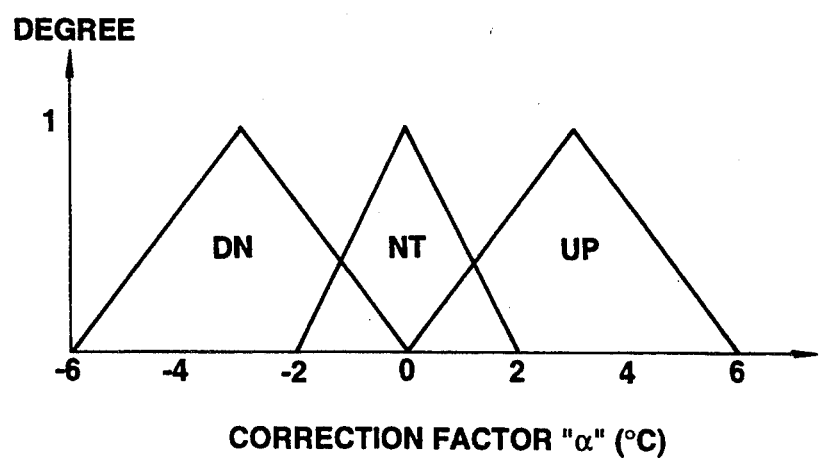
FIG. 59 is a graph of membership function, showing the classification in fuzzy label of correction factor, which is employed in the eighth embodiment.
FIG. 60 is a table showing a fuzzy rule employed in the eighth embodiment.

In a ROM of the fuzzy inference processing part 804, there are stored membership functions which are shown in FIGS. 57 to 59.

In the membership function graph of FIG. 57, the inside temperature "TINC" is represented by the axis of abscissa and the corresponding degree is represented by the axis of ordinate. The degree is represented by a fuzzy label. That is, when the inside temperature "TINC" is lower than 0° C., a fuzzy label "very cold (VC)" is provided, when the inside temperature "TINC" is within a range from −15° C. to +15° C., a fuzzy label "cold (C)" is provided, when the inside temperature "TINC" is within a range from 0 to +30° C., a fuzzy label "good (G)" is provided, when the inside temperature "TINC" is within a range from +15° C. to +45° C., a fuzzy label "hot (H)" is provided and when the inside temperature "TINC" is higher than +30° C., a fuzzy label "very hot (VH)" is provided.

In the membership function graph of FIG. 58, the intake air temperature "TINT" is represented by the axis of abscissa and the corresponding degree is represented by the axis of ordinate. When the intake air temperature "TINT" is lower than 0° C., a fuzzy label "very low (VC)" is provided, when the intake air temperature "TINT" is within a range from −15° C. to +15° C., a fuzzy label "low (C)" is provided, when the intake air temperature "TINT" is within a range from 0° to +30° C., a fuzzy label "good (G)" is provided and when the intake air temperature "TINT" is higher than +30° C., a fuzzy label "very high (VH)" is provided.

In the membership function graph of FIG. 59, the correction factor "α" is represented by the axis of abscissa and the corresponding degree is represented by the axis of ordinate. When the correction factor "α" is within a range from −6° C. to 0° C., a fuzzy label "minus correction (DN)" is provided, when the correction factor "α" is within a range from −2° C. to +2° C., a fuzzy label "no correction (NT)" is provided and when the correction factor "α" is within a range from 0° C. to +6° C., a fuzzy label "plus correction (UP)" is provided.

It is to be noted that the correction factor "α" corresponds to the difference between the temperature "TINC" detected by the inside temperature sensor 7 and the temperature actually provided in the passenger room.

In this eighth embodiment, such a fuzzy rule as shown in FIG. 60 is stored in the ROM of the fuzzy inference processing part 804.

In the eighth embodiment, the fuzzy control rule is so made that when the detected inside temperature "TINC" is high and the detected intake air temperature "TINT" is low or high, the inside temperature "TINC" is subjected to the "minus correction" and when the detected inside temperature "TINC" is low and the detected intake air temperature "TINT" is low, the inside temperature "TINC" is subjected to the "plus correction".

Figure 61:
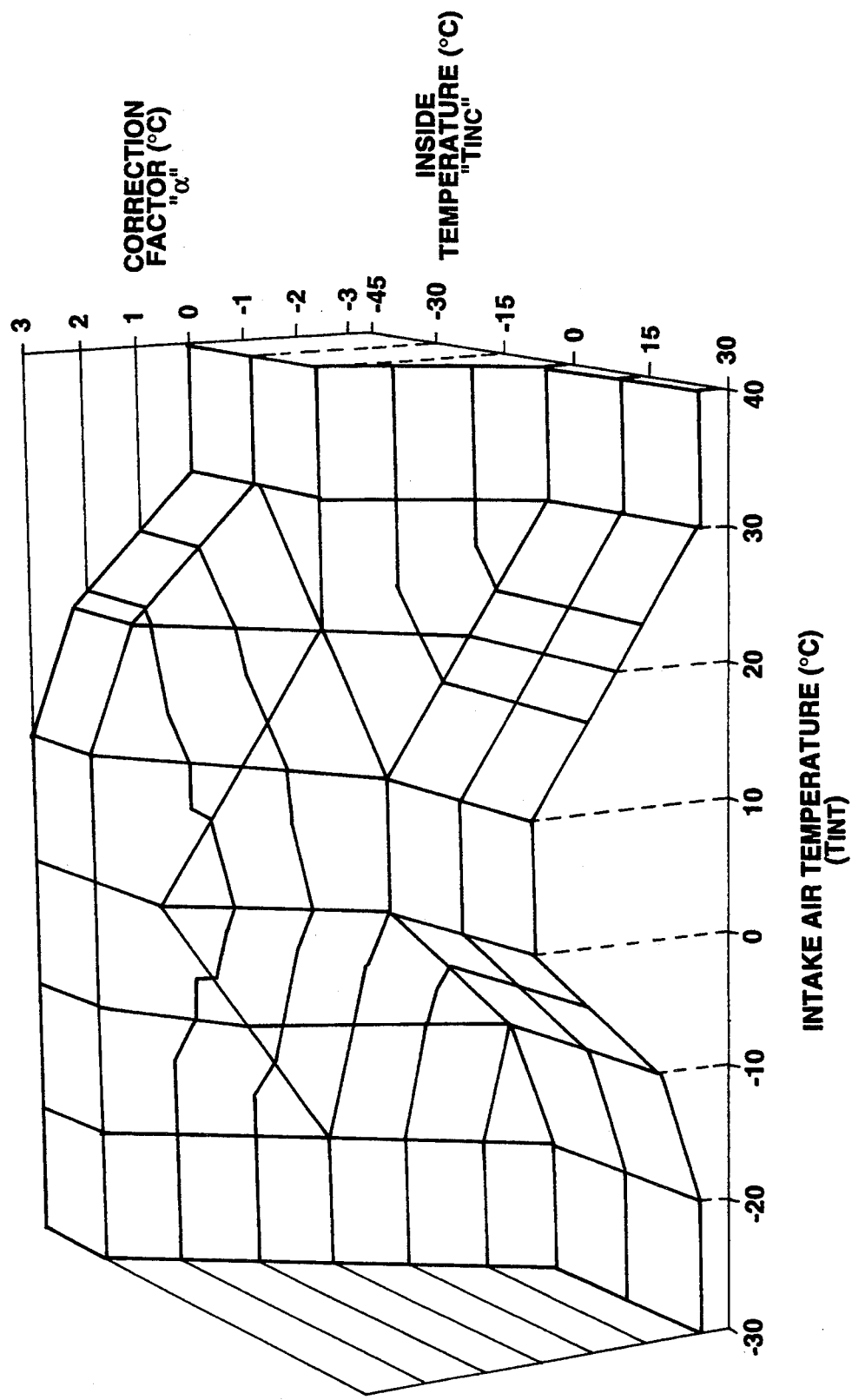
FIG. 61 is a three dimensional graph showing in a three-dimensional manner the relationship between the three parameters used in the eighth embodiment.

FIG. 61 is a three dimensional graph which shows in a three-dimensional manner the relationship between the inside temperature "TINC", the intake air temperature "TINT" and the correction factor "α".

Figure 62:
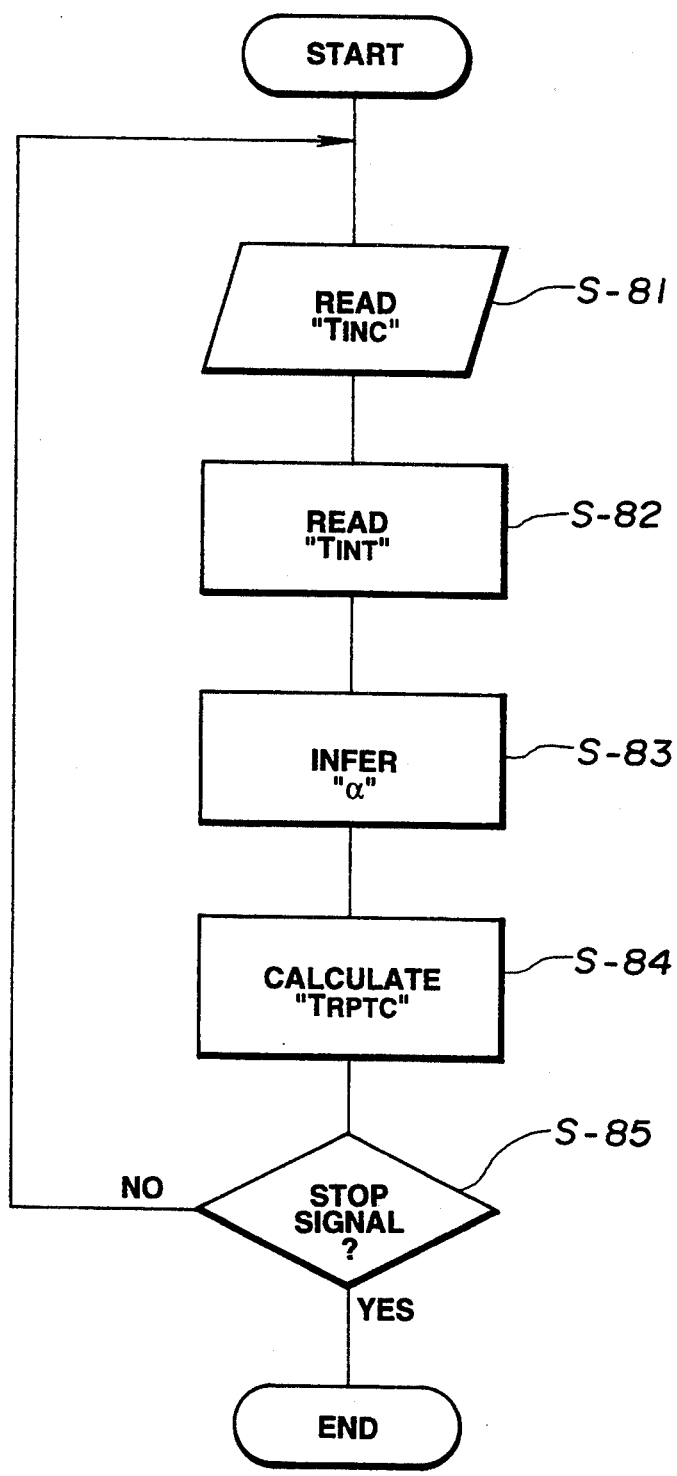
FIG. 62 is a flowchart showing programmed operation steps executed by a computer employed in the eighth embodiment.

The programmed operation of the air conditioning system of the eighth embodiment will be understood from the flowchart of FIG. 62.

As is seen from the above, in the eighth embodiment, the temperature control by the air conditioning system is smoothly carried out through out a wide range of the temperature. Furthermore, in this eighth embodiment, the inside temperature sensor 7 can be located at any position in the passenger room.

What is claimed is:

1. A computer-controlled automotive air conditioning system comprising:
an air conditioning unit which, when operated, produces a conditioned air fed to a passenger room of the vehicle;
an outside temperature sensor issuing a first signal representative of the temperature of surrounding air of the vehicle;
an inside temperature sensor issuing a second signal representative of the temperature of air in a passenger room of the vehicle;

a temperature setter switch which issues a third signal for setting the temperature in the passenger room when manipulated;

a solar radiation sensor issuing a fourth signal representative of the quantity of solar radiation pouring on the vehicle;

an intake air temperature sensor issuing a fifth signal representative of the temperature of air flowing in said air conditioning unit;

a computer-installed control unit for controlling operation of said air conditioning unit in accordance with said first, second, third, fourth and fifth signals; and means for operating said control unit under a fuzzy system theory so that the magnitude of at least one of said first, second, third, fourth and fifth signals is divided into a predetermined number of fuzzy labels of membership function to derive a parameter for the operation of said air conditioning unit.

2. A computer-controlled automotive air conditioning system as claimed in claim 1, in which the magnitude of said first signal and the difference between the magnitude of said second signal and that of said third signal are subjected to the fuzzy labeling to derive a predetermined number of fuzzy labels which are used for controlling the rotation speed of an electric blower motor installed in said air conditioning unit.

3. A computer-controlled automotive air conditioning system as claimed in claim 2, in which said predetermined number of fuzzy labels are represented by the membership function of voltage applied to said electric blower motor.

4. A computer-controlled automotive air conditioning system as claimed in claim 1, in which the magnitude of said fourth signal and the variation of the magnitude of said fourth signal per unit time are subjected to the fuzzy labeling to derive a predetermined number of fuzzy labels which are used for controlling the operation of said air conditioning unit.

5. A computer-controlled automotive air conditioning system as claimed in claim 4, in which said predetermined number of fuzzy labels are represented by the membership function of a solar radiation correction amount which is used for correcting an instruction signal applied from said control unit to said air conditioning unit.

6. A computer-controlled automotive air conditioning system as claimed in claim 1, in which the magnitude of said first signal and the variation of the magnitude of said first signal per unit time are subjected to the fuzzy labeling to derive a predetermined number of fuzzy labels which are used for controlling the operation of said air conditioning unit.

7. A computer-controlled automotive air conditioning system as claimed in claim 6, in which said predetermined number of fuzzy labels are represented by the membership function of an outside temperature correction amount which is used for correcting an instruction signal applied from said control unit to said air conditioning unit.

8. A computer-controlled automotive air conditioning system as claimed in claim 1, in which the third signal and said first signal are subjected to the fuzzy labeling to device a predetermined number of fuzzy labels which are used for controlling the operation of said air conditioning unit.

9. A computer-controlled automotive air conditioning system as claimed in claim 8, in which said predetermined number of fuzzy labels are represented by the membership function of a correction amount which is used for correcting an instruction signal applied from said control unit to said air conditioning unit.

10. A computer-controlled automotive air conditioning system as claimed in claim 1, in which the magnitude of said first signal and that of said second signal are subjected to the fuzzy labeling to derive a first predetermined number of fuzzy labels which are used for controlling the operation of said air conditioning unit, and in which the magnitude of said first signal and that of fourth signal are subjected to the fuzzy labeling to device a second predetermined number of fuzzy labels which are also used for controlling the operation of said air conditioning unit.

11. A computer-controlled automotive air conditioning system as claimed in claim 10, in which said first predetermined number of fuzzy labels are represented by the membership function of a first intake index value which is used for correcting an instruction signal applied from said control unit to said air conditioning unit, and in which said second predetermined number of fuzzy labels are represented by the membership function of a second intake index value which is used for correcting said instruction signal.

12. A computer-controlled automotive air conditioning system as claimed in claim 1, in which the magnitude of a set temperature correction amount signal and that of said fourth signal are subjected to the fuzzy labeling to derive a predetermined number of fuzzy labels which are used for controlling the operation of said air conditioning unit, said set temperature correction amount signal being produced by analyzing both said third signal and said first signal.

13. A computer-controlled automotive air conditioning system as claimed in claim 12, in which said predetermined number of fuzzy labels are represented by a correction factor which is used for correcting an instruction signal applied from said control unit to said air conditioning unit.

14. A computer-controlled automotive air conditioning system as claimed in claim 1, in which the magnitude of said fourth signal and that of said first signal are subjected to the fuzzy labeling to derive a predetermined number fuzzy labels which are used for controlling the operation of said air conditioning unit.

15. A computer-controlled automotive air conditioning system as claimed in claim 14, in which said predetermined number of fuzzy labels are represented by a correction factor which is used for correcting an instruction signal applied from said control unit to said air conditioning unit.

16. A computer-controlled automotive air conditioning system as claimed in claim 15, in which said instruction signal is further corrected by a set temperature correction amount signal which is produced by analyzing said third signal and said first signal.

17. A computer-controlled automotive air conditioning system as claimed in claim 1, in which the magnitude of said second signal and that of said fifth signal are subjected to the fuzzy labeling to device a predetermined number of fuzzy labels which are used for controlling the operation of said air conditioning unit.

18. A computer-controlled automotive air conditioning system as claimed in claim 17, in which said predetermined number of fuzzy labels are represented by a correction factor which is used for correcting an instruction signal applied by said control unit to said air conditioning unit.

* * * * *